United States Patent [19]
O'Neill et al.

[11] Patent Number: 4,939,648
[45] Date of Patent: Jul. 3, 1990

[54] APPARATUS AND METHOD FOR MONITORING WELL LOGGING INFORMATION

[75] Inventors: Dennis M. O'Neill, Easton; Paul C. Gingrich, Bethel; Peter W. Mullarkey, New Fairfield, all of Conn.; Laurent Moinard, Seattle, Wash.

[73] Assignee: Schlumberger Technology Corporation, New York, N.Y.

[21] Appl. No.: 128,658

[22] Filed: Dec. 2, 1987

[51] Int. Cl.$^5$ ............................................. G01V 11/00
[52] U.S. Cl. ..................................... 364/422; 364/200; 364/513
[58] Field of Search ................ 364/422, 200 MS File, 364/900 MS File

[56] References Cited
U.S. PATENT DOCUMENTS
4,646,240 2/1987 Serra et al. ........................... 364/422
4,791,618 12/1988 Pruchnik ............................. 364/422

OTHER PUBLICATIONS
"Dipmeter Advisor Expert System" *AAPG Bulletin*, vol. 66, No. 10, 1982, pp. 1703-1704.
Smith, "On the Development of Commercial Expert Systems", *AI Magazine*, vol. 5, No. 3, 1984, pp. 61-73.
Harmon et al., *Expert Systems: Artificial Intelligence in Business*, Wiley & Sons, New York, 1985, pp. 163-167.
Waterman, *A Guide to Expert Systems*, Addison-Wesley Pub. Co., 1986, pp. 262-264.
*Petroleum Abstracts*, University of Tulsa, Abstract No. 396,592, vol. 26, No. 10, Mar. 1986.
Geraghty et al., *Petroleum Abstracts*, University of Tulsa, Abstract No. 397,015, vol. 26, No. 11, Mar. 1986.
Baker et al., *Petroleum Abstracts*, University of Tulsa, Abstract No. 400,143, vol. 26, No. 19, May 1986.
Reid et al., *Petroleum Abstracts*, University of Tulsa, Abstract No. 400,364, vol. 26, No. 20, May 1986.
*Petroleum Abstracts*, University of Tulsa, Abstract No. 401,279, vol. 26, No. 22, May 1986.
Bergen et al., *Petroleum Abstracts*, University of Tulsa, Abstract No. 405,303, vol. 26, No. 34, Aug. 1986.
Palaz, *Petroleum Abstracts*, University of Tulsa, Abstract No. 407,748, vol. 26, No. 42, Oct. 1986.
Wu, *Petroleum Abstracts*, University of Tulsa, Abstract No. 412,230, vol. 27, No. 5, Jan. 1987.
Whittaker, *Petroleum Abstracts*, University of Tulsa, Abstract No. 412,603, vol. 27, No. 6, Feb. 1987.
Kuo, "Field-Scale Statigraphic Correlation Using Artificial Intelligence", *Geo Byte*, vol. 2, No. 2, May 1987.
Skandsen et al., "An Expert System for Interpretation of Lithology from Wireline Log Data", *Geoexploration*, vol. 24, No. 3, 1987.

(List continued on next page.)

*Primary Examiner*—Jerry Smith
*Assistant Examiner*—David Huntley
*Attorney, Agent, or Firm*—Peter Lee; Clifford Tager; Martin Novack

[57] ABSTRACT

A method and apparatus monitors well logging information obtained from a logging apparatus moveable in an earth borehole. In a disclosed embodiment, observers are established for determining the presence of specified characteristics of the logging information and generating observation-representative signals in response thereto. A knowledge base is provided, and contains a number of stored observations and stored situations which are linked by specified relationships, for responding to the observation-representative signals by computing and outputting an inference of a stored situation which is inferred from a stored observation corresponding to the observation-representative signals. In a disclosed embodiment, the knowledge base is responsive to observation-representative signals for establishing at least one confirming observer. The confirming observer is operative to determine the presence of further specified attributes of the logging information and to generate confirming observation-representative signals in response thereto. The knowledge base is also responsive to the confirming signals in its computation of the inference.

57 Claims, 38 Drawing Sheets

OTHER PUBLICATIONS

Records, "Computers with Brains: New Systems Find Uses in Drilling, Production", *Offshore*, vol. 46, No. 2, Feb. 1986, pp. 52-56.

Wu et al., "Well Log Data Interpretation Using Artificial Intelligence Technique" *Transactions of the SPWLA Annual Logging Symposium*, No. 27, Jun. 1986, pp. 1-17.

Palaz, "Artificial Intelligence: Expert Systems for Exploration", *Geophysics: The Leading Edge of Exploration*, vol. 5, No. 9, Sep. 1986, pp. 60-64.

M. A. Simpson, "A Microcomputer Approach to Drilling Engineering Problem Solving", SPE 14988, Soc. of Petroleum Engrs., 1986.

"Assistant Expert" Log Data Analysis Systems: Applications of Artificial Intelligence Programming Techniques in Formation Evaluation/A. H. Whittaker and J. D. Macpherson (Exploration Logging Inc.), 27th Annu. SPWLA Logging Symp. (Houston, 6/9-13/86, Trans. v2, pap. no. ss, 1986, (15 pp; 9 refs).

"Expect" (Expert System for Spectrometry): An Expert Systems Approach to Luminescence Fingerprint Interpretation-S. Geraghty and D. Field (NL Petroleum Serv. (UK) Ltd); 4th Offshore Conf. & Exhib. Ltd. Offshore Computers Conf. (Aberdeen, UK. 10/8-10/85 Proc. Pt. 2., 10 pp., 1985.

Welex Advertisement for Quality Curves, The Log Analyst, vol. XXVII, No. 2, p. 104, Mar.-Apr. 1986.

"Blackboard Systems: The Blackboard Model of Problem Solving and The Evolution of Blackboard Architectures", H. P. Nii, AI Magazine, Summer 1986.

"Blackboard Systems: Blackboard Application Systems, Blackboard Systems From A Knowledge Engineering Perspective", H. P. Nii, AI Magazine, Aug. 1986.

"Object-Oriented Programming: Themes and Variations", M. Stefik et al., AI Magazine, Winter 1984.

"Making Computers Think Like People", L. A. Zadeh, IEEE Spectrum, Aug. 1984.

"Signal-to-Symbol Transformation: HASP/SIAP Case Study", H. P. Nii, AI Magazine, Spring 1982.

"A Real-Time Expert System For Process Control", R. L. Moore, IEEE, 1984.

"Perspectives on Artificial Intelligence Programming", D. Bobrow et al., Science, 1986.

Log Quality Control, R. Bateman, International Human Resources Development Corp., Boston, 1985, [Table of Contents].

Impulse-86 A Substrate For Object Oriented Interface Design, R. G. Smith et al., OOPSLA Proceedings, Sep. 1986.

The Role of Frame-Based Representation In Reasoning, R. Fikes et al., Communication of The AMC, Sep. 1985.

Stratigraphic Correlation of Well Logs by Computer Techniques, A. Rudman et al., Amer. Assoc. of Petroleum Geologists, vol. 57, No. 3, Mar. 1973.

Normalization of Well Log Digitizing, G. S. Neinast et al., The Log Analyst, Mar.-Apr. 1974.

Field Studies: A Progress Report on the Contribution of Logging, Y. Boutemy et al., SPE, 1979.

The Determination of Porosity in Sandstones and Shaly Sandstones Part One—Quality Control, J. G. Patchettt et al., The Log Analyst, Nov.-Dec. 1979.

Porosity Log Calibrations, W. Lang, SPWLA Ad Hoc Log Calibration Committee Report, Mar.-Apr. 1980.

Digital Well Log Data-An Exploration Tool for the 1980's, D. Shier, Oil & Gas Journal, Mar. 1982.

An Artificial Intelligence Approach to Lithostratigraphic Correlation Using Geophysical Well Logs, R. A. Olea et al., SPE 15603, Oct. 1986.

A Rule-Based System for Well Log Correlation, R. A. Startman et al., SPE 15295, Jun. 1986.

Automatic Determination of Lithology From Well Logs, P.C. Delfiner, SPE 13290, Sep. 1984.

Rule-Based Versus Structure-Based Models for Explaining and Generating Expert Behavior, V. Dhar et al., Communications of the ACM, Jun. 1987.

```
OBJECT :   DETECTOR
TYPE :     CLASS
EDITED :              BY :
DETECT EVENT :
EVENT HANDLER :
NON EVENT HANDLER :
CREATE EVENT :
ACTIVATE EVENT DETECTOR :
DEACTIVATE EVENT DETECTOR :
INITIALIZE EVENT DETECTOR :
MISSING EVENT DATA :
CANDIDATE EVENT START :
CANDIDATE EVENT STOP :
MINIMUM LENGTH :
MAXIMUM GAP :
START BIAS :
STOP BIAS :
CURRENT SUPERIOR OBSERVATION :
CURRENT OBSERVATION :
```

Fig. 4

```
OBJECT :   OBSERVER
TYPE :     CLASS
EDITED :              BY :
ACTIVATION INDEX VALUE :
DEACTIVATION INDEX VALUE :
NEXT INDEX VALUE :
CHANNEL :
CHANNEL POSITION IN FRAME :
OBSERVATION :
CURRENT OBSERVATION :
UPDATE DEPTH :
QUALIFER :
ATTRIBUTE :
COMPUTE ATTRIBUTE :
INITIALIZE QUALIFIER COMPUTION :
CUTOFF VALUE :
LOWER CUTOFF :
```

Fig. 3

```
OBJECT :    CONFIRMER
TYPE :      CLASS
EDITED :                        BY :
EVALUATE EXPECTATION :
MET EXPECTATION HANDLER :
MISSED EXPECTATION HANDLER :
ACTIVATE EXPECTATION EVALUATOR :
DEACTIVATE EXPECTATION EVALUATOR :
INITIALIZE EXPECTATION EVALUATOR :
MISSING EXPECTATION DATA :
MET SAMPLES :
MISSED SAMPLES :
UNAVAILABLE SAMPLES :
COMPUTE TRUTH VALUE :
TRUTH VALUE :
MODERATELY CONFIRMED CUTOFF :
MODERATELY NOT CONFIRMED CUTOFF :
```

Fig. 5

DETECT EVENT MESSAGE HANDLER

EVENT HANDLER

MISSED EXPECTATION HANDLER

CREATE EVENT HANDLER

Fig. 28A

```
OBJECT :        SGT-PROBLEM
IS A :          SITUATION
GROUPS :        SGT, NOCLEAR MEASUREMENT
EDITED :           BY=
ACCOMPANIED BY :  OR-0127
ACCOMPANIES :

DOCUMENTATION : THERE IS A PROBLEM
   WITH THE SGT (DOWN HOLE GAMMA
   RAY LOGGING TOOL).
```

Fig. 28B

```
OBJECT :        OR-0127
IS A :          RELATION
GROUPS :
EDITED :           BY=

OPERAND(S) :  ( GR-TOO-HIGH, W_a )
              ( GR-TOO-LOW,  W_b )
              ( COMB-012,    W_c )

ACCOMPANIES :   SGT-PROBLEM
```

Fig. 28C

```
OBJECT :        COMB-012
IS A :          RELATION
GROUPS :
EDITED :           BY =

OPERAND(S): ( MARKER-FOUND-GR-OUT-OF-BOUNDS, W_d )
            ( GR-LARGE-STEP, W_e )

OPERAND OF :    OR-0127
```

OBJECT: BSALT-MARKER-1744
SYNONYMS:
GROUPS: BSALT Local Geology Data
TYPE: INDIVIDUAL
EDITED:
   Minimum Top: 5100.0
   Maximum Top: 5600.0
   Minimum Thickness: 200.0
   Maximum Thickness: 400.0
   Maximum Streak Thickness: 60
   Lithology: EVAPORITE
   Formation:
   GROUP: Salina
   SERIES: Cayvgan
   SYSTEM:
   Detecting Channel: RHOB
   Detector: RHOB Lithology Bedding Detector
   Wait For Marker:

|         | GR     | NPHI   | PEF   | RHOB  |
|---------|--------|--------|-------|-------|
| Minimum | 4.000  | -.0220 | 4.000 | 2.030 |
| Maximum | 11.000 | -.0100 | 4.600 | 2.070 |

Fig. 31

```
OBJECT:            RHOBLithologyBeddingDetector
GROUP              GEOLOGICAL DETECTOR
TYPE:              CLASS
EDITED:                                        BY:
CHANNEL:           RHOB
EVENT TYPE:        GEOLOGICAL PARTITION
WINDOW WIDTH:      .1
MIN. BED THICKNESS: 10
```

APPARATUS AND METHOD FOR MONITORING WELL LOGGING INFORMATION

BACKGROUND OF THE INVENTION

This invention relates to the field of well logging and, more particularly, to improvements in the automatic monitoring of well logging information for quality control and other purposes. The invention is applicable to wireline well logging and also to logging while drilling.

The monitoring of the general quality of borehole logging data is a routine procedure for field personnel that are responsible for running logs at a wellsite. Typically, the field engineer will observe logging data as it is being collected to determine if it is within an expected range, and if its behavior appears consitent with readings that are normally obtained when running the type of logging device that is being used. If and when an abnormal or anomalous condition is observed, and if the observed condition is recognized as being indicative of an identifiable problem, the field engineer may be able to take appropriate corrective action. For example, he may make adjustment of controls, replace a defective device, and/or rerun a section of logging data while the opportunity still exists for doing so.

For a number of reasons, there are limitations on the present ability of field engineers to recognize anomalies and respond to them during or just after the logging process. To understand these limitations, and their consequences, consider the following:

In various applications, a number of logging devices are run simultaneously, and the field engineer has to divide his attention between various types of arriving logging data.

Most field engineers are well trained, but experience levels vary considerably. Even well trained logging personnel cannot be expected to know every nuance of the many available logging devices. Therefore, there are necessarily human limitations in the ability to recognize anomalies, much less diagnose them—particularly during the time frame of the logging operation when many things are happening at once.

When a logging run has been completed, there is generally little time available to make decisions regarding the adequacy of the logging information which has been obtained. The enormous expenses associated with drilling and completion dictate that the next phase of work start almost immediately, and the opportunity to re-run logs under the same or similar circumstances may be irretrievably lost. In some situations, when the logging truck leaves the well site, the next step is the setting of casing. Many logging tools work only in open-hole and cannot measure formations through casing. If log quality problems are found after the casing has been set, it will be too late to re-run faulty logs.

A recently devised approach uses computer-generated "quality curves", which process selected logging signals and display readings of the quality of logging information. The provision for simple checks of log value extremes also exists. However, existing computer-generated log quality approaches suffer one or more of the following shortcomings: lack of flexibility in the type of applicable logging devices and/or conditions monitored; increase in the amount of information that the engineer must cope with; inability to provide information concerning the cause of a sensed anomaly; inability to assist in diagnosing the cause of the problem; inability to provide confirmation that a problem exists; and inability to operate and/or produce useful assistance "on the fly", i.e., in real time.

It is among the objects to the present invention to provide a log monitoring system and method which is responsive to these shortcomings of the prior art.

Another prior art practise which is well established, but could stand improvement, pertians to the use of logs from offset wells (and/or other sources of local geological knowledge) for comparison with logs being run in a present well to check that the log values are within expected ranges. Typically, a number of geological markers are identified, and it is attempted to match logging responses against these markers. However, existing techniques for using markers suffer some of the same types of shortcomings that are mentioned above; particularly, inability to provide, during the logging run, marker identification and accompanying real-time log quality evaluation.

It is among the further objects of the invention to provide improvement in techniques and apparatus for use of local geology information in efficiently and accurately locating geological markers in a well being logged, in evaluating quality of logs which should respond to the marker, and in doing so during the logging operation itself.

SUMMARY OF THE INVENTION

The present invention provides the field engineer, during the data acquisition process, with the assistance necessary to decide, in most circumstances, whether any logs need to be re-run before leaving the wellsite. Indeed, the invention can provide quality control guidance during the logging run itself, together with information classifying and/or diagnosing anomalies that occur during logging.

In accordance with a form of the invention, there is provided an apparatus for monitoring well logging information obtained from a logging apparatus moveable in an earth borehole. Typically, although not necessarily, the well logging apparatus will include a number of well logging devices capable of making various type of measurements (e.g. electrical, nuclear, and sonic, etc.) in the borehole to provide information concerning the location and nature of subsurface formations and the nature of the borehole itself.

In an embodiment of the invention, observations means, responsive to the logging information, are provided for establishing observers which determine the presence of specified characteristics of the logging information and generating observation-representative signals in response thereto. Knowledge base means are provided, and contain a number of stored observations and stored situations which are linked by specified relationships, for responding to the observation-representative signals by computing and outputting an inference of a stored situation which is inferred from a stored observation corresponding to the observation-representative signals.

In accordance with a feature of the invention, the knowledge base is operative to output the inference in real time with respect to the logging information being monitored. (As used herein, "real time" operation means substantially concurrent with the logging process; that is, with most system outputs being available during the logging procedure and some just after completion thereof.)

In the preferred embodiment of the invention, there is provided a buffer memory means for storing the logging information to be monitored. The observation means is responsive to logging information stored in the buffer memory menas. This, and other features hereof, to be described, facilitate asynchronous operation of the system. Also in the preferred embodiment, the knowledge base means includes means responsive to the observation-representative signals for establishing at least one confirming observer in the observation means. The confirming observer is operative to determine the presence of further specified attributes of the logging information and to generate confirming observation-representative signals in response thereto. The knowledge base means is also responsive to the confirming signals in its computation of the inference. The confirming observer can operate asychronously with the first-mentioned observers. In accordance with a disclosed feature, the confirming observer is provided with a depth interval that is dynamically adjusted in accordance with the depth locations associated with the observation-representative signals.

In accordance with a further form of the invention, there is provided an apparatus for monitoring logging information which includes means for storing expected location range and expected logging characteristics for at least one geological marker traversed by the borehole. Means are provided for establishing an observer which detects the presence of a specified characteristic of the logging information to identify the locations of candidate beds within the expected location range of the marker. Means are also provided for establishing at least one further observer which detects the presence of at least one further specified characteristic of the logging information at the locations of the candidate beds. The candidate beds are screened by testing said at least one further specified characteristic against said expected logging characteristics, and removing candidates which do not meet the test. Remaining candidates are combined into groups. The group, if any, which most closely resembles the marker is slected by comparison of observed characteristics with expected characteristics. Finally, means are provided for generating output indications of the presence and location of the group which most closely resembles the marker.

In a preferred embodiment of this form of the invention, the storing means further stores an expected thickness range of said marker, and any group having a thickness that is outside the expected thickness range is eliminated. In this embodiment, the storing means further stores a maximum streak thickness for the marker, and the combining of groups into candidates involves grouping candidates which are separated by less than the maximum streak thickness.

Further features and advantages of the invention will become more readily apparent from the following detailed description when taken in conjunction with the accompanying drawings.

BRIEF DESCRIPTION OF THE DRAWINGS

FIG. 3 illustrates an example of a window view of an observer object as used in the present embodiment.

FIG. 4 illustrates an example of a window view of a detector object as used in the present embodiment.

FIG. 5 illustrates an example of a window view of a confirmer object as used in the present embodiment.

FIGS. 28A, 28B, 28C and 28D illustrate the nature of objects of the FIG. 27 digaram.

FIG. 31 illustrates a window view of an example of an instantiated marker definition object in the local geology knowledge base.

DESCRIPTION OF THE PREFERRED EMBODIMENTS

Figure 1:
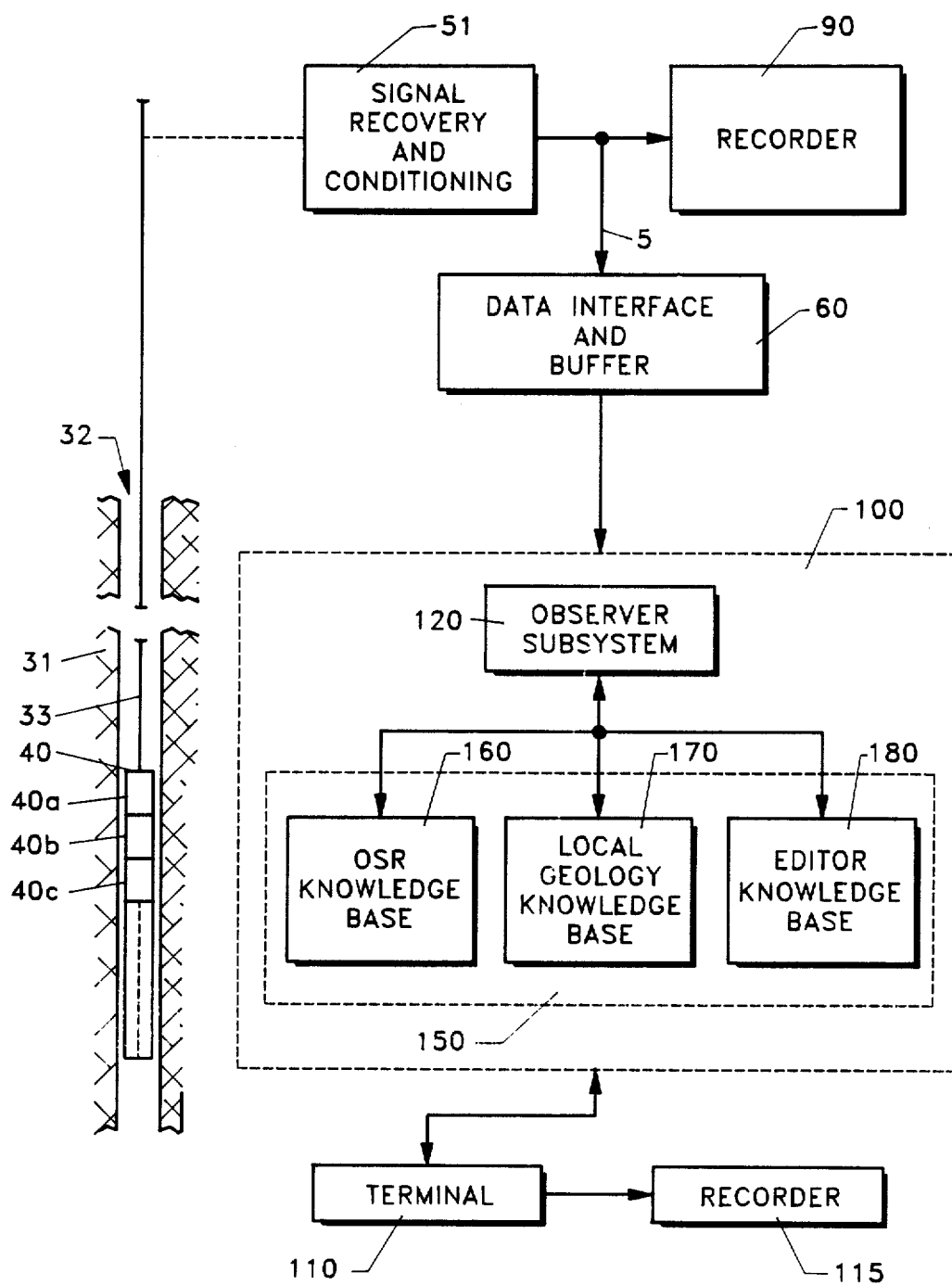
FIG. 1 is a block digaram, partially in schematic form, of an apparatus in accordance with an embodiment of the invention, and which can be used to practise an embodiment of the method of the invention.

Referring to FIG. 1, there is shown an embodiment of an apparatus in accordance with the invention, and which can be utilized to practice the method of the invention. Subsurface formations 31 are traversed by a borehole 32 which is typically, although not necessarily, filled with a drilling fluid or mud. A well logging apparatus 40 is suspended in the borehole 32 on an armored cable 33, the length of which substantially determines the depth of the apparatus 40. The cable length is controlled by suitable known means at the surface (not shown), such that a depth level index is available in conjunction with the logging data. A time index is also typically available.

The logging apparatus 40 typically includes a number of logging devices, 40a, 40b, . . . , for example electrical, nuclear, and/or sonic logging devices. However, the principles of the invention are applicable regardless of the number and type of logging devices employed. The invention also has application to logging while drilling and logging while tripping systems.

Circuitry 51, which includes conventional logging signal recovery and conditioning circuits, is shown at the surface of the earth, although portions thereof may be located downhole. Suitable recording means 90 are also conventionally provided.

The data from circuitry 51 is generally in the form of digital frames, with a typical frame being available on a depth level index or time index basis, and having various groups of bits that represent different portions of the logging information. Again, it will be understood that the principles of the invention apply to any suitable format or convention of data representation.

The data frames are coupled to control and data interface and buffer 60 which, in the present embodiment, includes a circular buffer memory for receiving the data frames and maintaining their availability for a substantial period of time after arriva. The buffer memory size will be selected in accordance with practicalities of storage size and computational requirements for a particular application. The interface and buffer 60 is coupled to a processor 100, shown in dashed line, which can be implemented, for example, using a suitably programmed MICROVAX xomputer, manufactured by Digital Equipment Coproration, of Maynard, Mass., together with associated memory (not separately illustrated) and user interface as represented by terminal 110 and recorder 115. The processor 100 is organized to include an observer subsystem or module 120 and, communicating therewith, a knowledge base system 150 which includes knowledge base subsystems designated as the OSR knowledge base 160, the local geology knowledge base 170, and the editor knowledge base 180.

In the illustrated embodiment hereof, the apparatus is implemented using a so-called "blackboard architecture", with the computer system programmed in the object-oriented language "STROBE" (also known as the "CLASS" system), which is available from Sun Microsystems Mountain View, Calif. (For description of blackboard architectures see, for example, "Blackboard Systems: The Blackboard Model of Problem Solving and the Evolution of Blackboard Architectures, H. P. Nii, AI Magazine, Summer, 1986, and "Blackboard Systems: Blackboard Application Systems, Blackboard Systems From a Knowledge Engineering Prospective", H. P. Nii, AI Magazine, Aug., 1986.) In STROBE, entities in the task domain are represented as objects whose characteristics are described by a number of "slots", as will be illustrated further hereinbelow. The defined objects are linked together in a variety of relationships, and objects can be viewed or altered using a knowledge-based display oriented editor such as Impulse-86 (knowledge base 180 in FIG. 1), which is also available from Sun Microsystems (and is also known as the "HYPERCLASS" System).

There are various object-oriented programming languages presently in use. As is well known, in object-oriented programming, objects combine the attributes of preocedures and data. Objects store data in variables and respond to messages by carrying out procedures. Objects can be classes or instances of a class. A class is a description of one or more similar objects. An instance of a class has its structure and methods defined by its class, but has its own instance variables (its "slot" values) which more specifically define the instance. Classes have the feature of "inheritance". When a class is placed in a class lattice, it inherits certain characteristics of the classes above it in the lattice. (A lattice is like a hierarchical tree, but wherein objects can have more than a single parent.) For further background see, for example, "Object-Oriented Programming: Themes and Variations", M. Stefik et al., AI Magazine, Winter, 1984.

As will become more evident, object-oriented programming provides certain advantages in the context of the present invention, and the illustrated embodiment was implemented in terms of object-oriented programming. Although some features of the invention use aspects of object-oriented programming to particular advantage, it will be understood that most aspects of the invention are not limited to any specific programming approach.

In the embodiment of FIG. 1, the system reads data frames as they arrive from the logging system, and stores them in a circular buffer. The block 120 represents the observers (i.e., individual observer objects) of the sytem that are established to make observations concerning the data. An observer makes calculations concerning the data and applies a defined test to the result of the calculation. [For example, a particular observer may have the task of determining whether the signals from a certain logging device stay within a given range over a given window of depth levels.] If the observer's test criteria are met, then the observer "reports" that its test has been met; this being done by the observer causing creation of what is called an "event".

In the present embodiment, observers can function in two different modes. In a detector (or "search") mode, the observer reports with regard to any interval of data (i.e., an interval of depth level samples, where a depth level index is being used), over which the observer's criteria are met. In a confirmer (or "directed") mode the observer is assigned a specific interval of data to look at, and it reports as to whether the test is satisfied over this specific interval.

Figure 2:
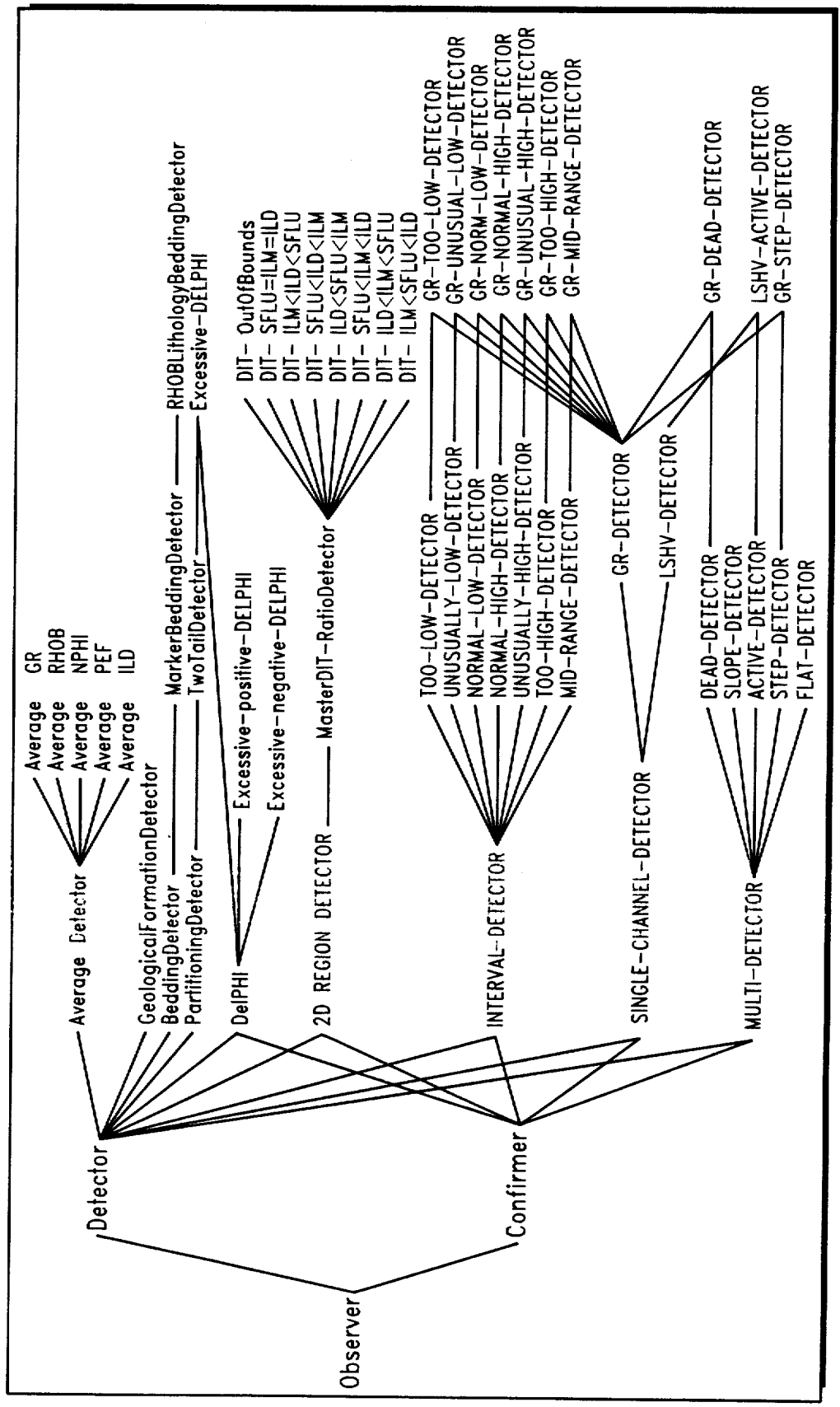
FIG. 2 illustrates some objects in the class lattice for observer objects in the present embodiment.

Referring to FIG. 2, there is shown an example of some objects in the class lattice for observer objects in the present embodiment. The highest order of class is seen to be "observer" and, as noted above, an observer can function as a detector or a confirmer, so there are subclasses having these names. At succeeding subclass levels are more specifically defined observers, for example "Interval Detector", "Too High Detector" and "GR Too High Detector", with each class level having more specificity. As indicated above, each class has the property of "inheritance", in that it inherits the characteristics of its parent classes. Also, it will be noted that a class can be a subclass of more than one parent class. For example, the class "Interval Detector" is indicated as a subclass of both detector and confirmer, so an "Interval Detector" can be established as either a detector or a confirmer. From an inheritance standpoint, it will have all the characteristics common to detectors and confirmers, as well as its own further and more specifically defined characteistics. As is known in the filed of object-oriented programming, this provides great flexibility and efficiency in defining and using objects in the system.

FIG. 3 shows an exmple of an observer object as used in the present embodiment and display as a window image using the editor 180. The Figure illustrates the characteristics (slots) of the observer object.

The slot "Object:" indicates the name of the object, which is "observer" in this case.

The slot "Type:" indicates whether the object is a class or an instance of a class. The former is applicable in this example.

The slots "Edited:" and "By:" indicate the date the object was last edited, and the name of the person who performed the edit.

The next two slots "Activation Index Value:" and "Deactivation Index Value:" are the sample index values (e.g. using a depth level index) which determine the range over which this observer will be active.

The slot "Next Index Value:" indicates the next index value that will be processed by this observer.

The slots "Channel:" and "Channel Position In Frame:" indicate the portion of the data frame with which this observer will concern itself. For example, if this observer is observing behavior of a particular logging device in the string of logging devices, then the slot "Channel:" will be the name of the logging device or measurement, and the slot "Channel Position In Frame:" will identify the group of bits in the data frame which contain the measurement of interest for this observer.

The slot "Observation:" is a pointer to the entity that will be oreated (i.e., by instantiation of an object) if and when the observation is met. As will be described further hereinbelow, the entity may be, for example, a corresponding observation in one of the knowledge bases 150 (FIG. 1). The slot "Current Observation:" indicates that the entity already exists.

The slot "Update Depth:" invokes a handler, to be described, which updates the record of depth level where the attribute has been found, and "propagates" this information to other related objects in the system.

The slot "Qualifier:" indicates a qualifying test to be used, such as "greater than", "less than", "monotonic", etc.

The slot "Attribute:" indicates the name given to the attribute which is to be computed by this observer and the slot "Compute Attribute:" indicates the mathematical expression or relationship (or a pointer to the appropriate code therefor) that is used in determining a quantity upon which the observation is based. For example, if the quantity is an average over a given window, if the quantity is an average over a given window of samples, the mathematical expression would represent the summation and division necessary to obtain the desired average.

The slot "Initiazlize Qualifier computation:" is used in initialization.

The slots "Cutoff Value:" and "Lower Cutoff Value:" indicate the upper and lower bounds the computed attribute must be within for an event to be deemed to have occurred.

FIG. 4 shows a window image and illustrative slots of the detector object as used in the present embodiment.

The "Create Event:" slot contains a pointer to the "create event" routine which is invoked when the detector attribute has been met, as will be described further hereinbelow.

The "Event Handler:", "Non Event Handler:", and "Detect Event:" slots invoke handlers which will be described further hereinbelow.

The "Activate Event Detector:" and "Deactivate Event Detector:" slots are meassaged when it is desired to start running or stop running the detector.

The "Missing Event Data:" is used to invoke a missing data handler when the expected data is no longer available. This generally indicates an "overspeed" condition. The missing data handler points the detector to the oldest available data sample.

In the detection of attributes of well logging data, it is important to bear in mind that many events only have significance if they persist over at least some minimum number of data samples. Also, due to fctors such as the nature of the formations or borehole, noisy environment, and/or measuring imperfections, there may be small dropouts or "gaps" between portions of a logging signal that should be ignored. These are handled in the detectors of the present embodiment by providing slots called "Minimum Length:", which specifies the minimum logging length over which the signal must meet the specified requirement, and "Maximum Gap:", which specifies the maximum number of data samples that can fall outside the specified requirement without it being deemed an interruption of a continuing event. Also, determination of certain logging properties may involve using a number of log values within a moving "window". When this is done, consideration should be given to adjusting the depth levels at which the computed attribute is deemed to have started to be present and to have stopped being present (due to the size of the window on both sides of the nominal window "position"). This is handled in the detectors of the present embodiment by providing slots called "Start Bias:" and "Stop Bias:" which respectively specify the adjustment to the starting and stopping points of the interval over which the attribute met the requirement.

FIG. 5 shows a window image and illustrative slots of the confirmer object as used in the present embodiment.

The "ACtivate Expectation Evaluator:" and "Deactivate Expectation Evaluator:" slots are messaged when it is desired to start and stop running the confirmer.

The "Missing Expectation Data:" slot is used to invoke a missing data handler when the expected data is no longer available. This generally indicates an "overspeed" condition. The missing data handler points the detector to the oldest available data sample. Also the "Unavailable Sampels:" slot is incremented.

The "Met Samples:" and "Missed Samples:" slots are used to keep track of the number of met and missed samples (i.e. which meet and don't meet the requirement).

The "Unavailable Samples:" slots keeps count of missing data samples.

The "Evaluate Expectation:", "Met Expectation Handler:" and the "Missed Expectation Handler:" slots invoke handlers which will be described further hereinbelow.

The "Initialize Expectation Evaluator:" is used to message the initalization of this confirmer object.

The slot "Compute Truth Value:" is used to compute a belief level by dividing the number of met samples by the total of met, missed, and missing samples over the depth interval. The computation of belief levels is discussed below. The computed belief level is stored in the slot "Truth Value:". The cutoff values for the belief levels are stored in the slots "Moderately Confirmed Cutoff:" and "Moderately Not Confirmed Cutoff:".

Figure 6:
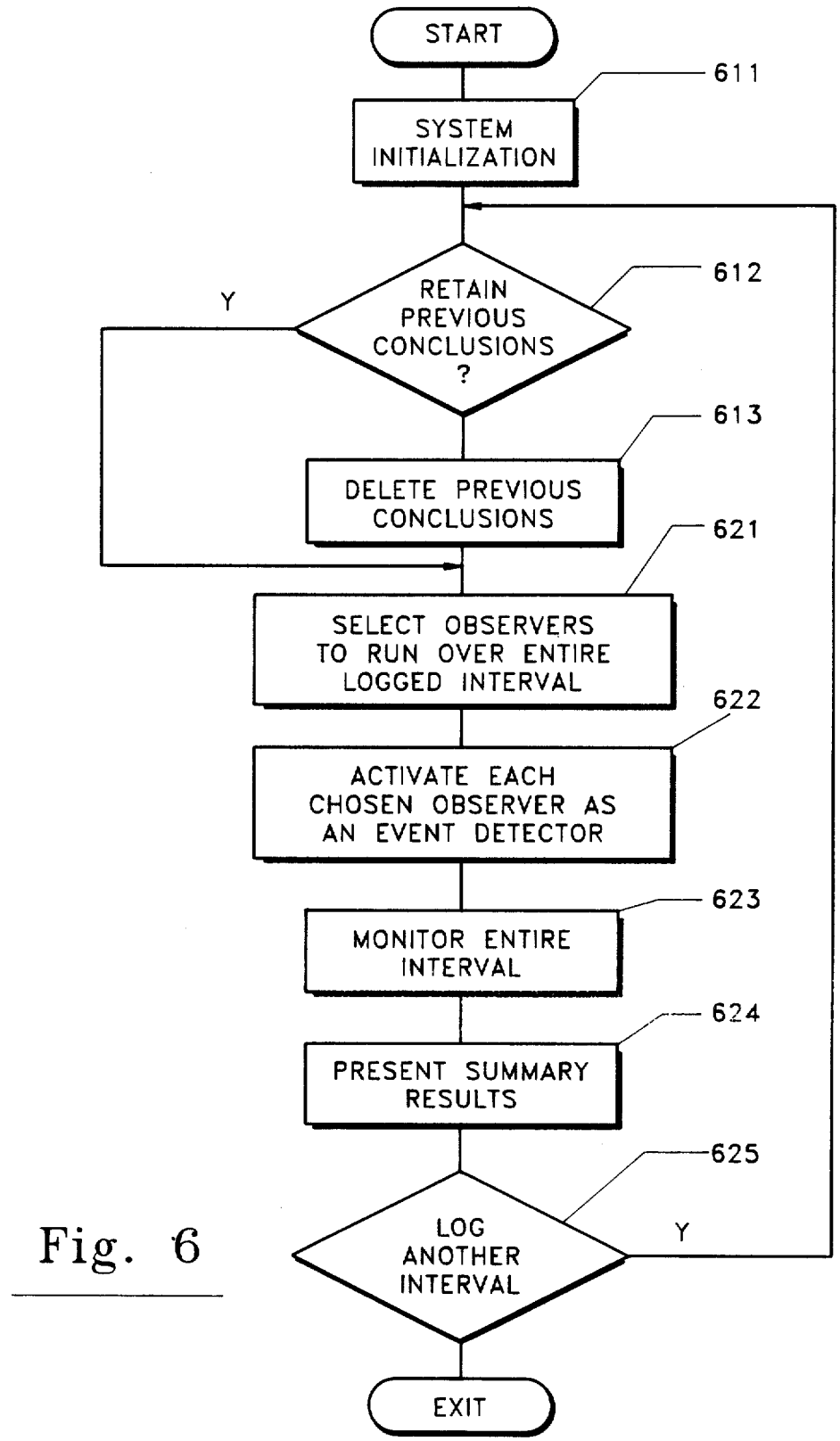
FIG. 6 illustrates a flow diagram of the controlling routine for the observer subsystem.

Referring to FIG. 6, there is shown a flow diagram of the controlling routine for the observer system. The block 611 represents system initialization, which includes conventional initialization procedures associated with startup. Inquiry is then made (diamond 612) as to whether previous calculations are to be retained, and if they are not, they are deleted (block 613). The observers to run over the entire interval to be logged are selected (block 621), and each observer chosen to act as an event detector is activated (block 623). When logging commences, the entire interval is then monitored (block 622) and results are presented (block 624). When another interval is to be logged (diamond 625), the diamond 612 is reentered.

Figure 7:
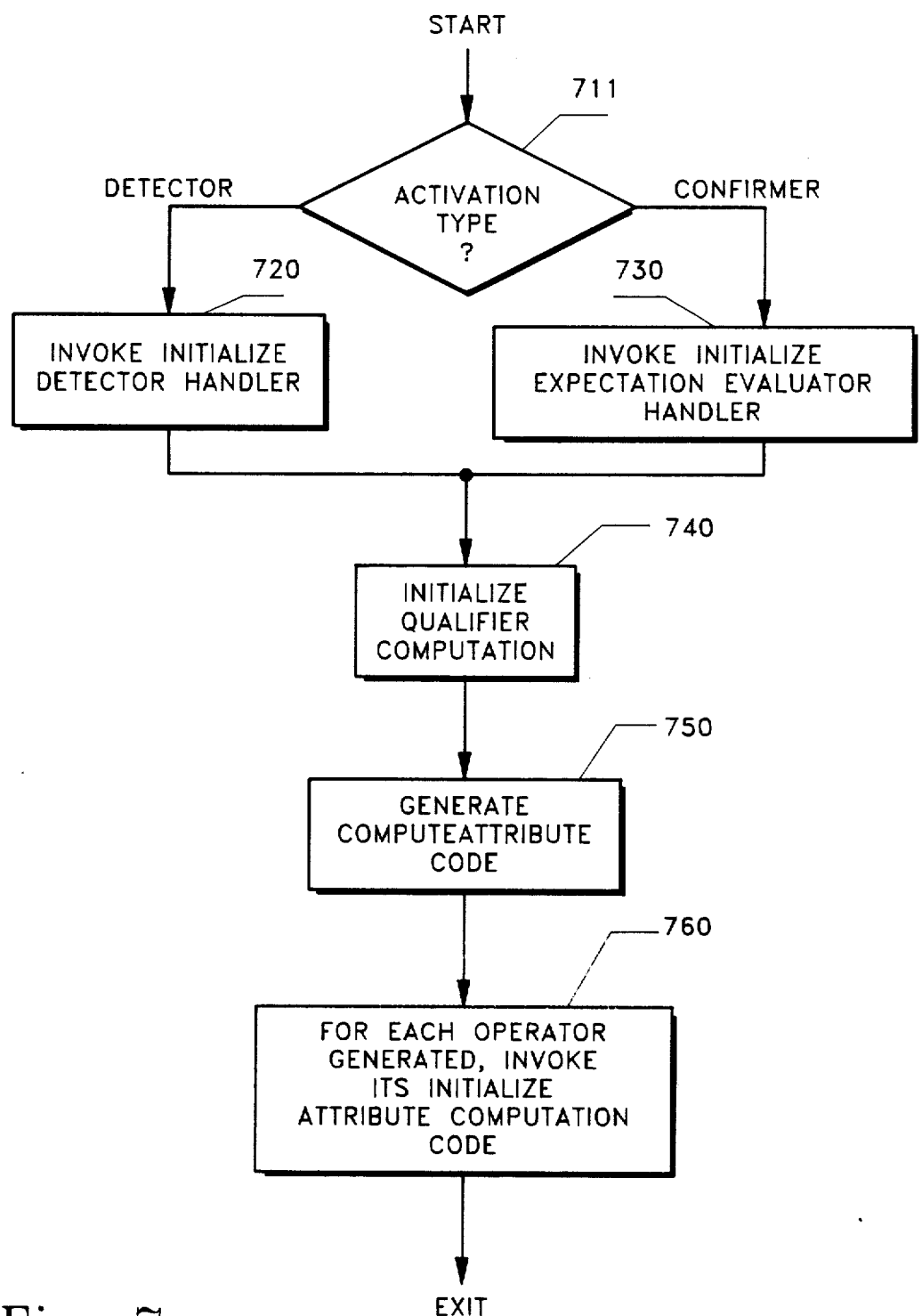
FIG. 7 illustrates a flow diagram of the routine for initializing the observers.

FIG. 7 is a flow diagram of the routine for initializing the observers. In the diagram of FIG. 7, inquiry is made (diamond 711) as to whether the activation type is detector or confirmer. If it is a detector, the handler for initialized event detector is invoked (block 720), whereas, if it is confirmer, the handler for initializing expectation evaluator is invoked (block 730). The qualifier computations are initialized (see qualifier slot desdribed above), as represented by block 740, and program code corresponding to the attribute computation is generated and stored in the complete attribute slot (block 750). Finally, for each attribute opeator generated, its attribute compulation code is initialized (block 760).

Figure 8A:
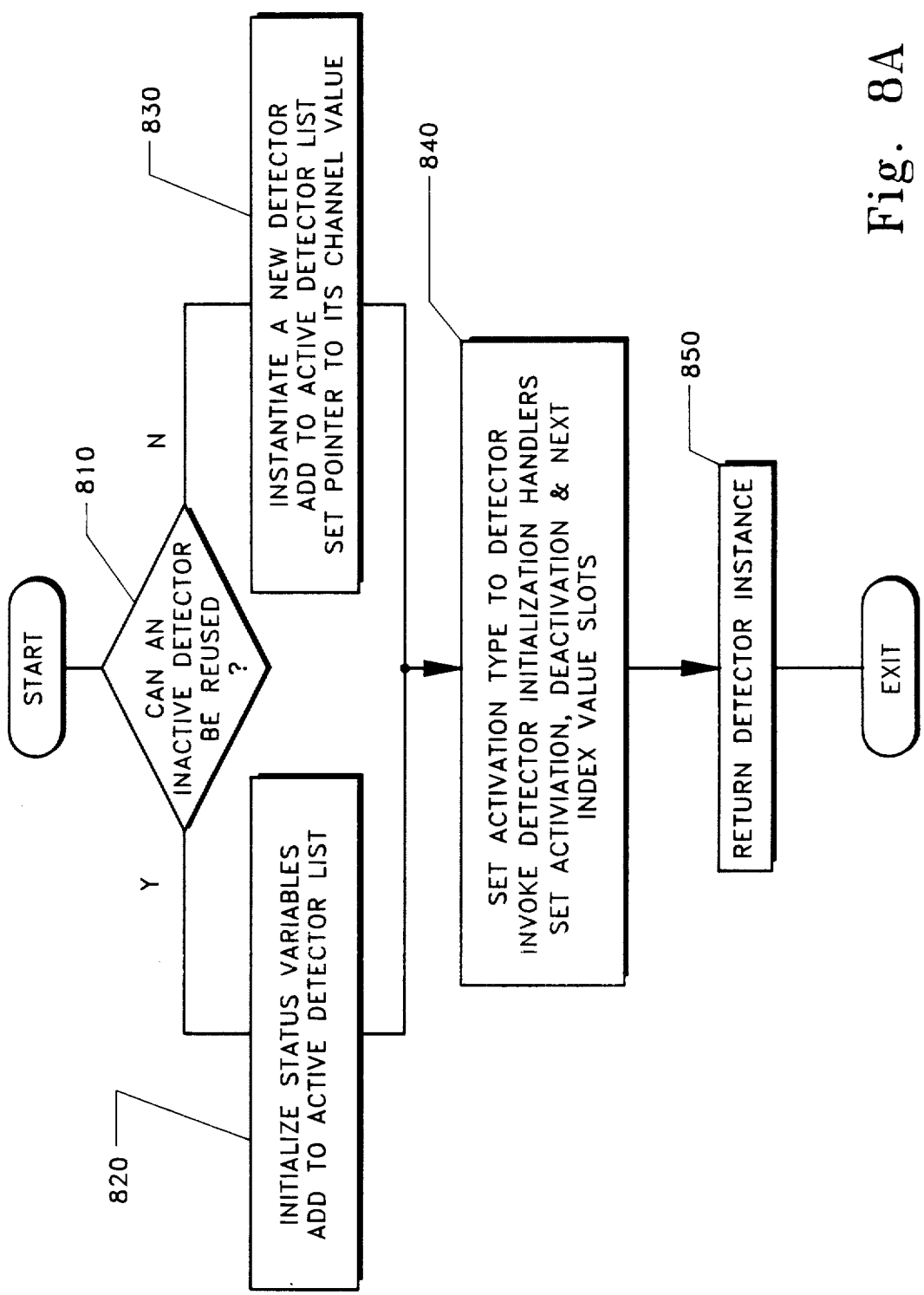
FIGS. 8A and 8B respectively illustrate the flow diagrams for activating detectors and confirmers.
Figure 8B:
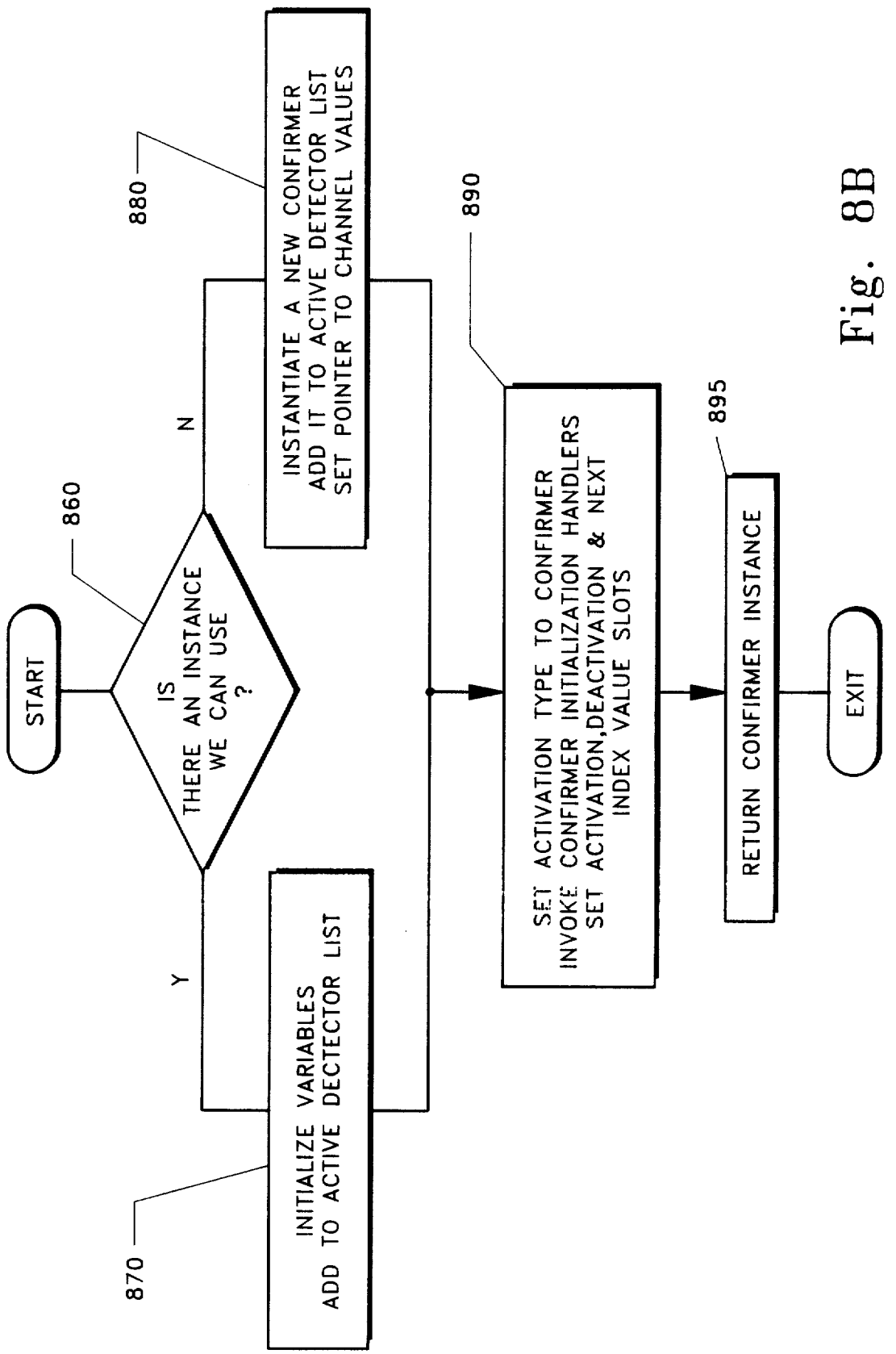

FIGS. 8A and 8B respectively illustrate the flow diagrams for activating detectors and confirmers. As previously noted, detectors are typically activated at the beginning of the logging operation. However, detectors can also be activated in response to the creation of an observation. This allows additional detectors to "focus in" on a particular observation in order to provide more detailed analysis of the observation. When a detector operates in this fashion, it is said to be a subordinate observer relative to a current superior observation. See the discussion of the local geology subsystem for an example of how this feature is used.

Inquiry is initially made as to whether an inactive detector can be reused (to increase efficiency), as indicated by diamond 810. If so, the status variables of the inactive detector are initialized, and it is added to the active detector list (block 820). If not, a new detector is instantiated and added to active detector list. Also, the pointer for its channel values are set (block 830). Next the detector initialization handlers are invoked, and the activation, deactivation and next index value slots are set (block 840). The formualted detector instance is then returned (block 850).

FIG. 8B shows a similar diagram for activating a confirmer, and includes diamond 860 and blocks 870, 880, 890 and 895 which are similar in operation to corresponding blocks in the flow diagram of FIG. 8A. In this case, however, it is noted that a confirmer is generally not activated upon initiazlization but, rather, subsequently upon demand, as will be described further hereinbelow. In this case, of course, the activation type is set to "confirmer". Also, in this case, it is confirmer handlers that are invoked.

Figure 9:
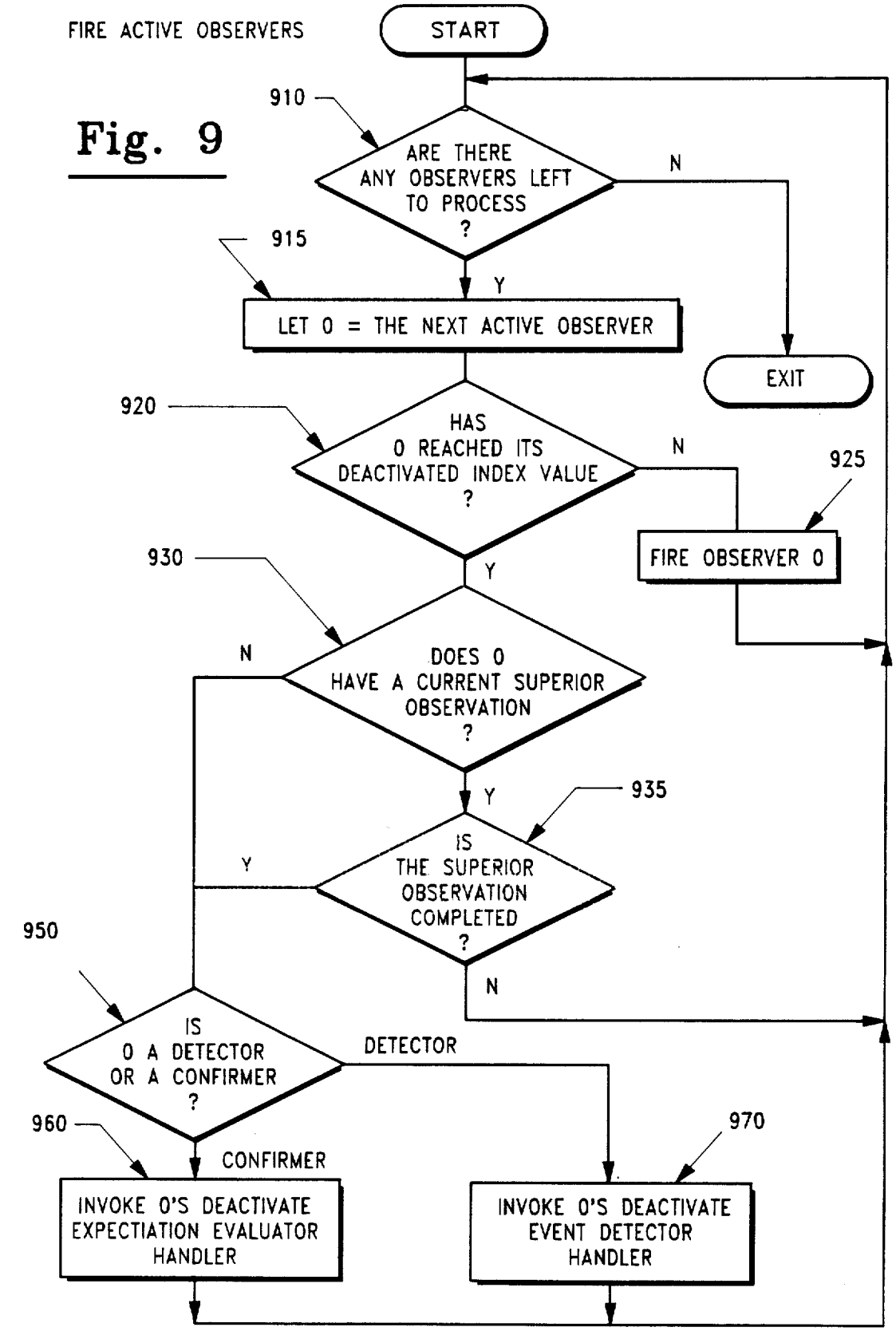
FIG. 9 illustrates a flow diagram of the routing for firing the active observers.

Referring to FIG. 9, there is shown the routine for firing the active observers. In the present embodiment, the observers are fired in sequence, although it will be understood that they can be fired in an order of priority, if necessary or desirable. In FIG. 9, inquiry is made (diamond 910) as to whether there are any observers left to process. If so, the next active observer is designated O (block 915), and inquiry is made (diamond 920) as to whether O has reached its deactivation index. If not, observer O is fired (block 925), and the decision diamond 910 is reentered. If O has reached its deactivation index, inquiry is made (diamond 930) as to whether O depends on a superior observation (in other words, is O a subordinate observer?). If not, depending on O's activation type (block 950), it is deactivated either as a confirmer (block 960) or a detector (block 970). However, if O is a subordinate observer, inquiry is made (block 935) as to whether the related superior observation has been completed. If it has, observer O is deactivated (agin, block 950, 960 and 970), but if it has not, O is not deactivated, and the decision diamond 910 is reentered. This takes into account the fact that even if a subordinate observer has reached its current deactivation index, said index may still be extended by virute of extension of the index of the superior observation, as will be described further.

Figure 10:
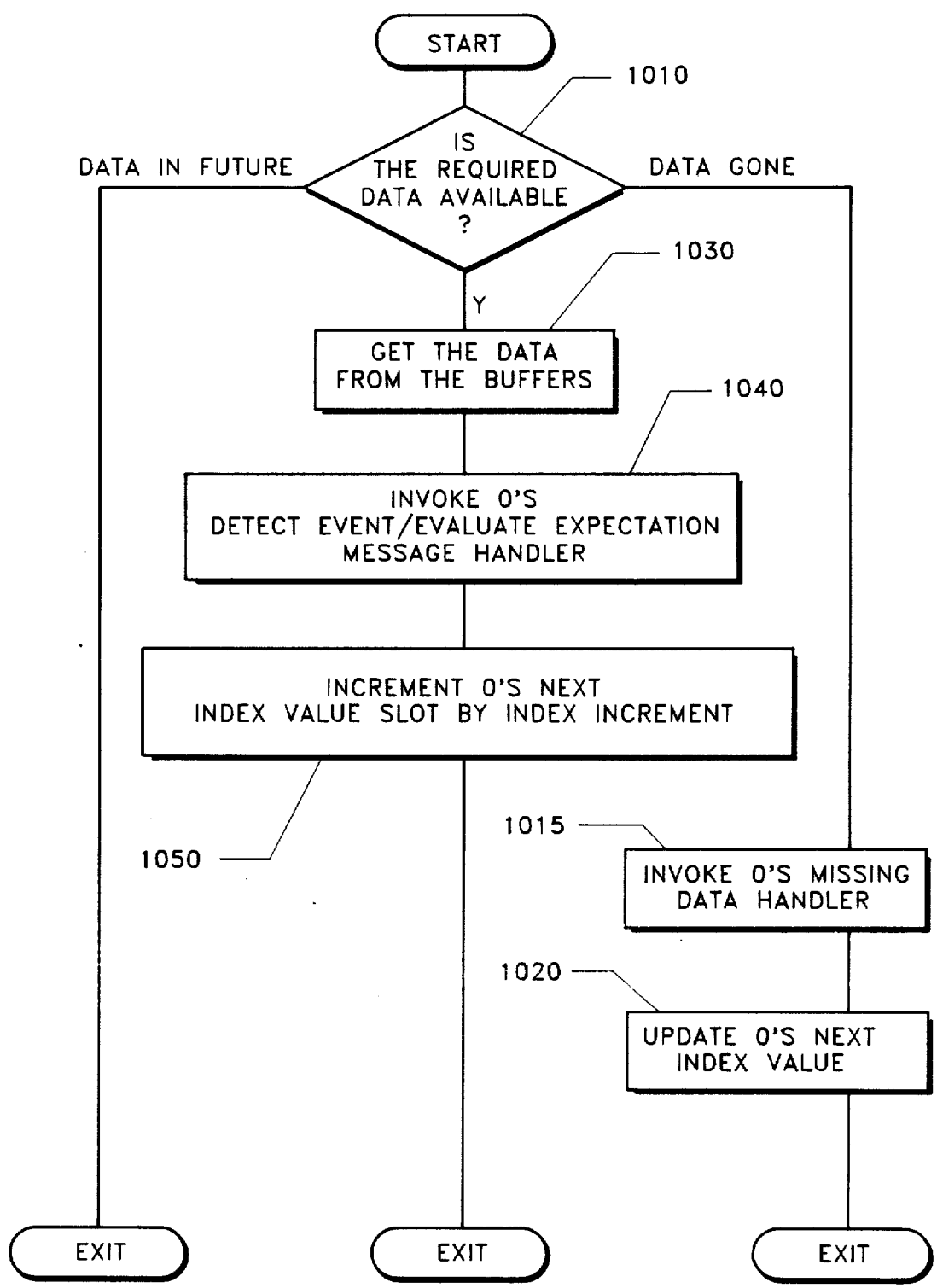
FIG. 10 illustrates a flow diagram of the routine for firing an observer O.

FIG. 10 shows the routine for firing observer O. Inquiry is made (diamond 1010) as to whether the required data is available in the buffers. If the data has not arrived yet, the routine exits (back to FIG. 9). If the data is already gone from the buffer, the observer's missing data handler is invoked (block 1015) and O's index value is updated (block 1020). If the reuqired data was found to be available, the data is fetched from the buffer memory (block 1030) and the observer's "detect event" message handler is invoked (if the observer is a detector), or its "evaluate expectation" message handler is invoked (if the observer is a confirmer), as represented by the block 1040. The observer's "next index value" slot is then incremented by the index increment, as represented by the block 1050.

Figure 11A:
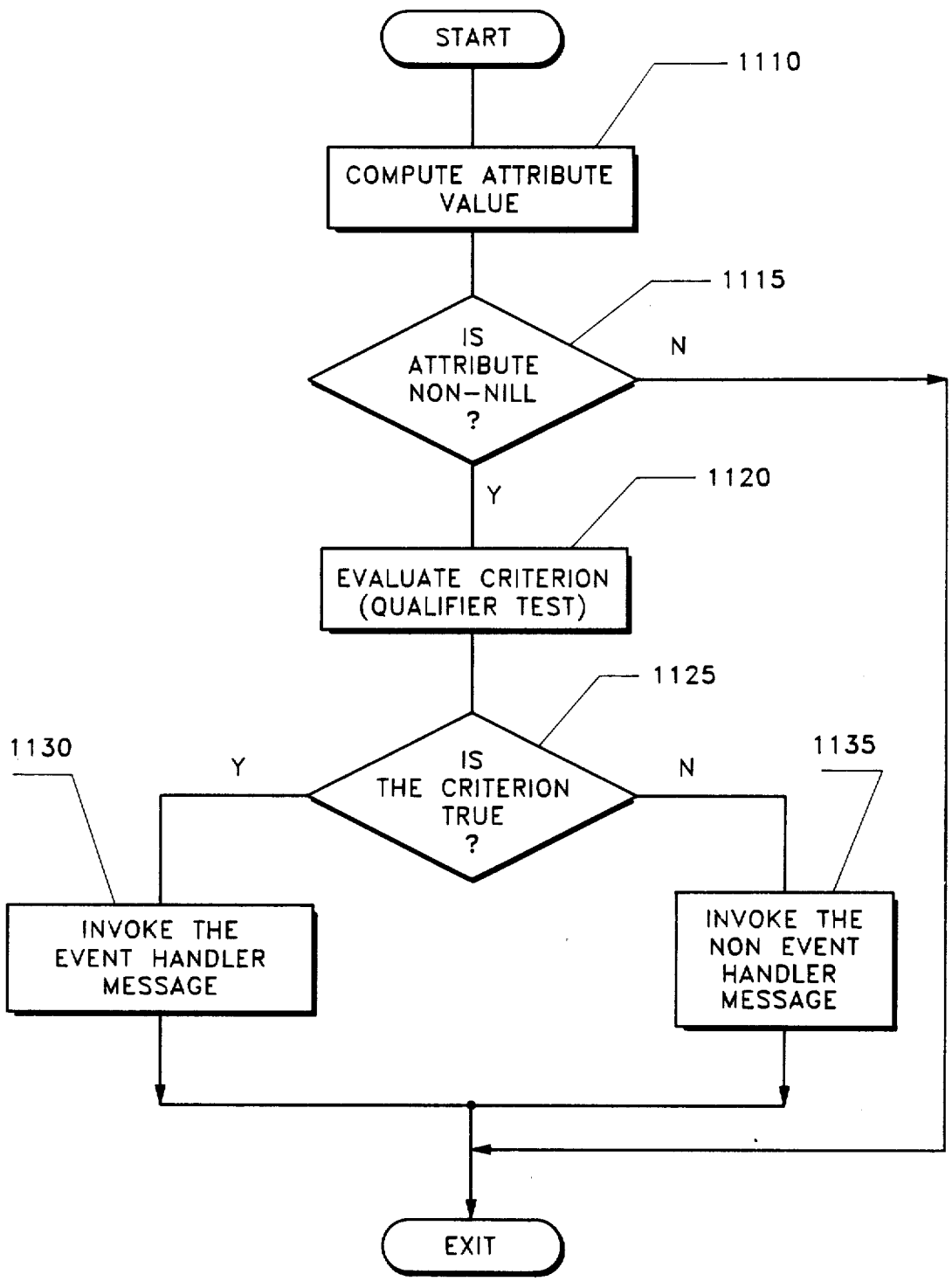
FIGS. 11A and 11B respectively illustrate flow diagrams of the routines for the "detect event" and "evaluate expectation" message handlers.
Figure 11B:
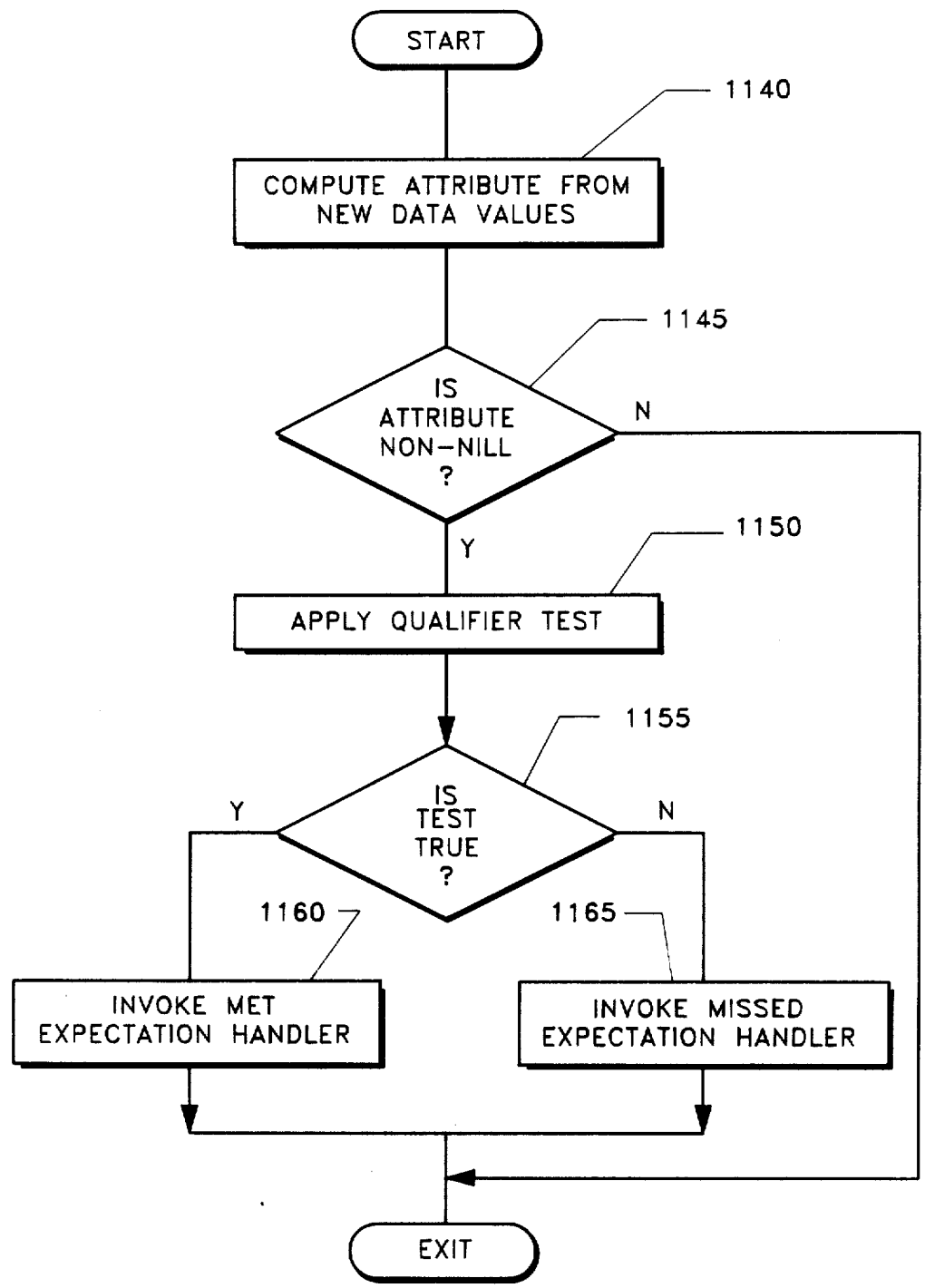

FIGS. 11A and 11B respectively illustrate the routines for the "detect event" message handler (which is used by detectors) and the "evaluate expectation" handler (which is used by confirmers). In both cases, these message handlers are invoked when the attribute is found to be present (although it remains to be seen if a particular candidate will be long enough to result in an event being created (in the case of a detecor) or a fully confirmed conclusion being made (in the case of confirmer).

In FIG. 11A (which, as noted, deals with an observer being used as a detector), the block 1110 represents computation of the attribute value. Inquiry is made (diamond 1115) as to whether the attribute is non-nil. If the attribute is nil, the routine exits. If the attribute exists, the qualifier test is applied (block 1120), and inquiry is made (diamond 1125) as to whether the qualifier criterion is true. If it is, the "event handler" message is invoked, and if it is not the "nonevent handler" message is invoked.

The routine of FIG. 11B operates in similar manner to that of FIG. 11, with the attribute being computed (block 1140), tested for presence and qualifier criterion (diamond 1145, block 1150, and diamond 1155), and invoking of either the "met expectation" handler (block 1160) or the "missed expectation" handler (block 1165).

Figure 12:
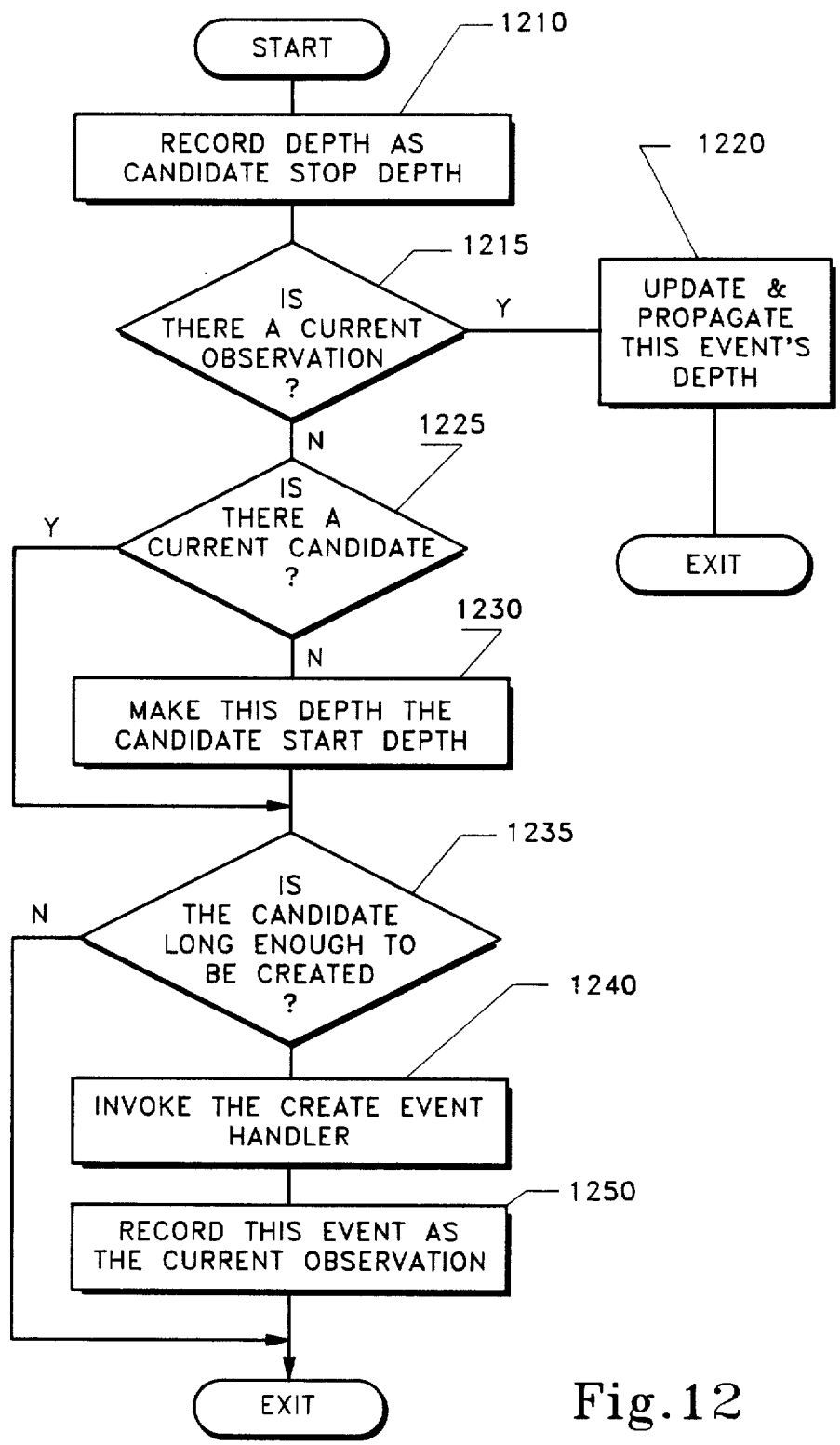
FIG. 12 illustrates a flow diagram of the routine for the "event" handler.

FIG. 12 shows the routine for the event handler (which, as noted above, is invoked when the attribute meets the qualifier test). The current index is recorded as the candidate stop depth (block 1210), and inquiry is made as to whether there is a current observation (diamond 1215); in other words, whether this is a continuation of a previously created event. If so, the existing event's depth is updated and propagated, via the "update event boundary" routine (FIG. 18), as represented by the block 1220. If not, inquiry is made (diamond 1225) as to whether there is a current candidate (for creation of an event) and, if not, the current index is recorded as the candidate start depth (block 1230). Next, inquiry is made (diamond 1235) as to whether the cnadidate is long enough (minimum length) to be created. If not, the routine is exited. If so, however, the "create event" handler is invoked (block 240), and this event is recorded as the current observation (block 1250).

Figure 13:
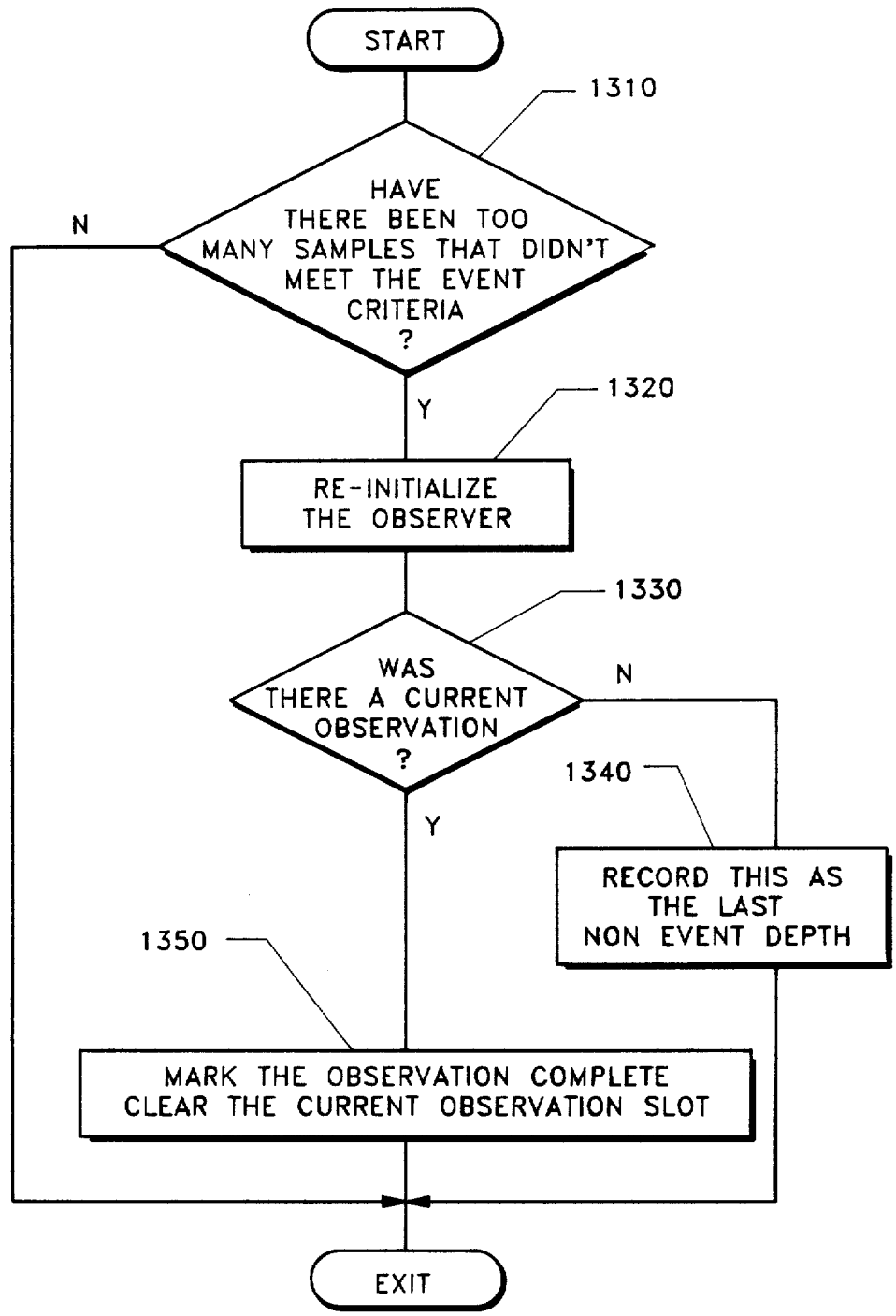
FIG. 13 illustrates a flow diagram of the routine for the "nonevent" handler.

FIG. 13 shows the routine for the "nonevent" handler which, it will be recalled, is invoked when the qualifying criterion is found to be not true (FIG. 11A). Inquiry is made (diamond 1310) as to whether there have been too many samples that did not meet the event criteria (e.g., as exceeding the "maximum gap", as previously described). If not, this routine is exited. If so, however, the observer (detector, in this case) is reinitialized (block 1320), and inquiry is made (diamond 1330) as to whether there was a current observation. If not, the current index is recorded as the last non-event depth (block 1340). If there was a current observation, however, the observation is marked as complete, the completion procedure is performed and the "current observation" slot is cleared (block 1350).

Figure 14:
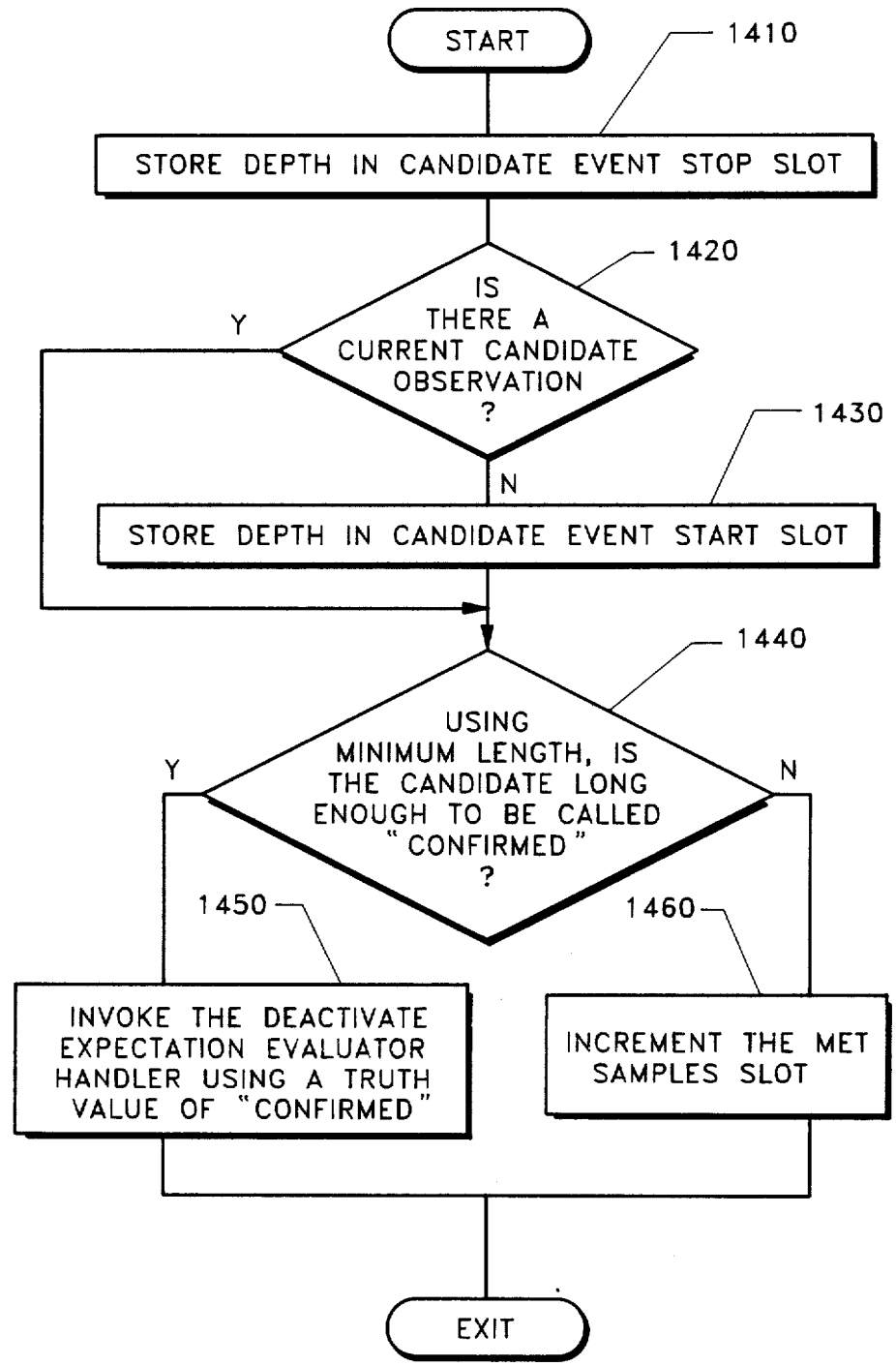
FIG. 14 illustrates a flow diagram of the routine for the "met expectation" handler.
Figure 15:
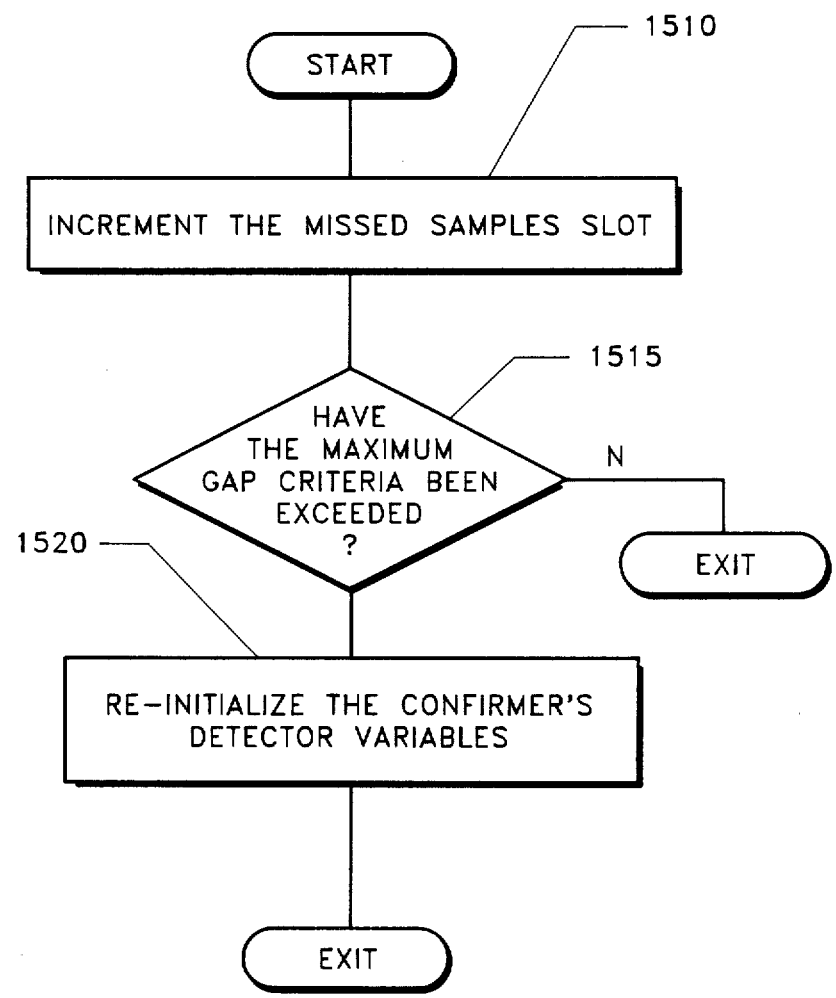
FIG. 15 illustrates a flow diagram of the routine for the "missed expectation" handler.

FIGS. 14 and 15 respectively described the routines for the "met expectation" handler and the "missed expectation" handler. These routines are analogous to the routines of FIGS. 12 and 13, respectively, but relate to a confirmer rather than to a detector. In FIG. 14, the depth of the current sample is recorded as the candidate stop depth for the confirmer (block 1410), and inquiry is made (diamond 1420) as to whether there is a current candidate. If not, the depth is recorded as the candidate start (block 1430). Determination is then made (diamone 1440) as to whether the current candidate is long enough (minimum length) to be fully confirmed. If not, the slot value of the count of "met samples" is incremented (block 1460). If so, the "deactivate expectation evaluator" handler (FIG. 20) is invoked with a "confirmed" value (block 1450).

In the "missed expectation" handler routine of FIG. 15, the confirmer slot which counts missed samples is incremented (block 1510), and inquiry is made as to whether the criteria have been missed over too long an interval (diamond 1515). If so, the confirmer is reinitialized, (block 1520) and the handler exits.

Figure 16:
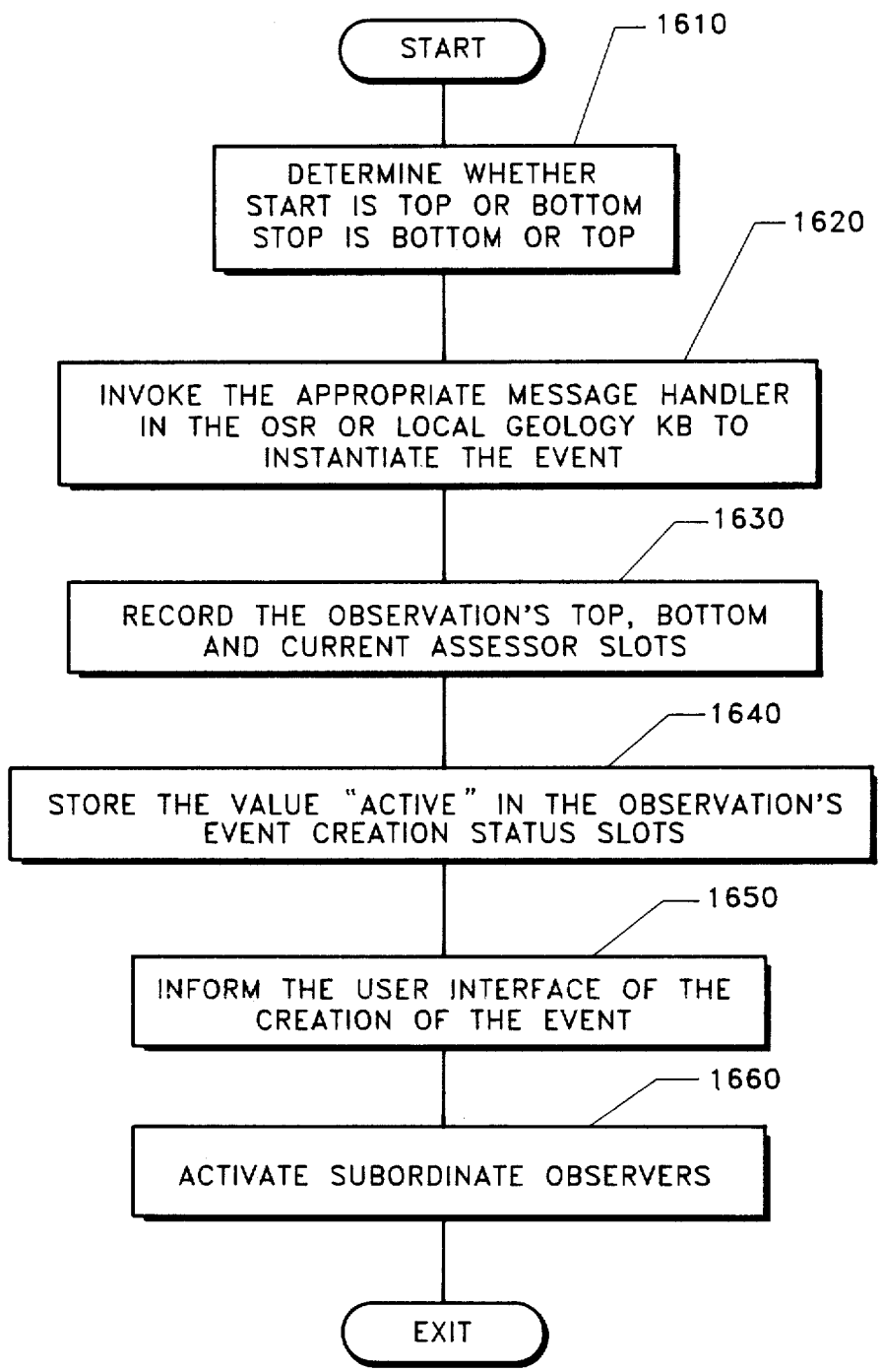
FIG. 16 illustrates a flow diagram of the "create event" routine.

FIG. 16 shows the flow diagram of the "create event" routine. Determination is made as to whether a start is a top or bottom or a stop is a bottom or a top (i.e., is logging proceeding up or down), as represented by the block 1610. The message handler is then invoked to instantiate the event in the knowledge base portion of the system, as represented by the block 1620. This is the "reporting" of the event to the knowledge base subsystem, and the message handler is invoked via the "Observation:" slot that was discussed above. the observation's top, bottom, and current assessor are recorded (block 1630) and the status of an event having been created is stored in the "event creation status" slot as represented by the block 1640. The user interface is then informed of the event, as represented by the block 1650. This may take the form of an indication on the user display 110 (FIG. 1), or any other suitable indicator. Finally, any subordinate observers associated with the event are activated (block 1660).

Figure 17:
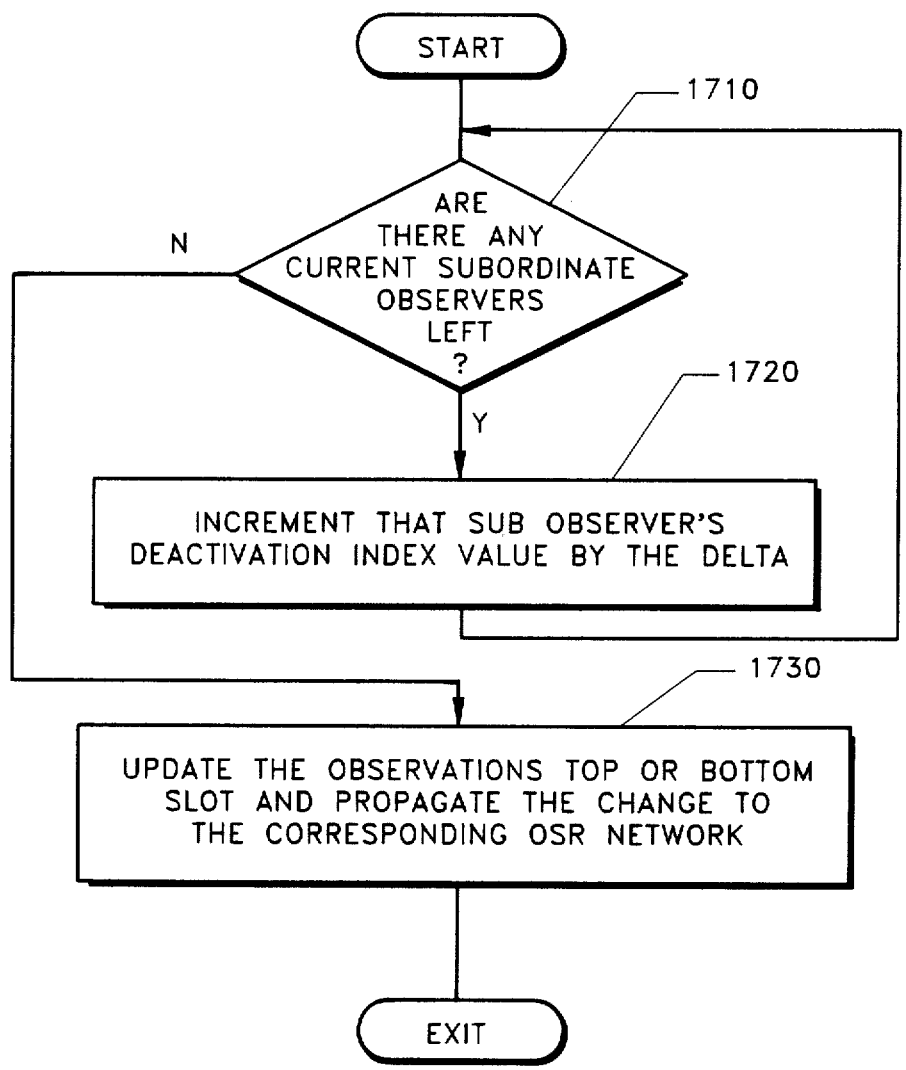
FIG. 17 illustrates a flow diagram of the routine for updating the observation depth.

FIG. 17 illustrates the routine for updating the observation depth. Inquiry is made (diamond 1710) as to whether there are any current subordinate observers left. If so, each subordinate observer's deactivation index is incremented (block 1720) by the change in depth. When complete, the block 1730 is entered, this block representing the update of the observation's depth slot in the knowledge base subsystem 150.

Figure 18:
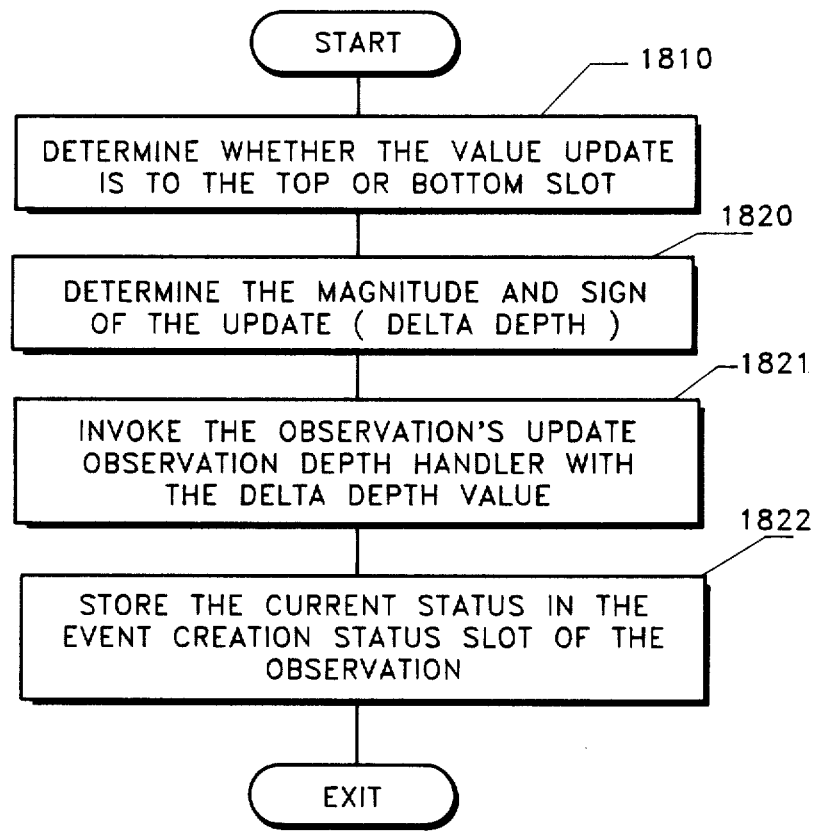
FIG. 18 illustrates a flow diagram of the "update event boundary" routine.

FIG. 18 illustrates the "update event boundary" routine. The block 1810 represents determining whether the update is to the top or bottom boundary. The magnitude and sign of the update is then determined (block 1820), and the "update depth" message handler is invoked (block 1821). The status is then stored in the "Event Creation Status:" slot, as represented by the block 1822.

Figure 19:
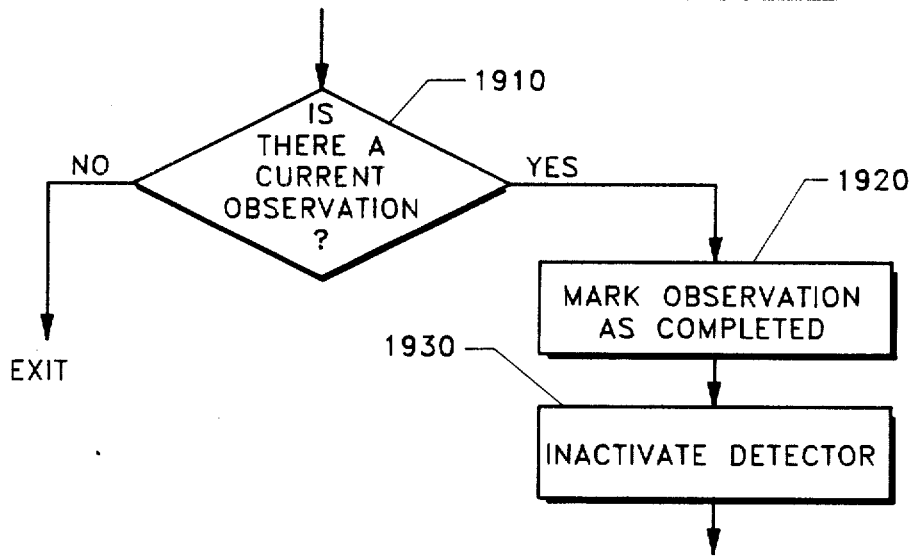
FIG. 19 illustrates a flow diagram of the routine for the "deactivate event" handler.

FIG. 19 is a flow diagram of the routine for the "deactivate event" handler. Inquiry is made (diamond 1910) as to whether there is a current observation. If not, nothing is done, and the routine is exited. It there is a current observation, the observation is marked as completed (block 1920), and the detector is deactivated (block 1930).

Figure 20:
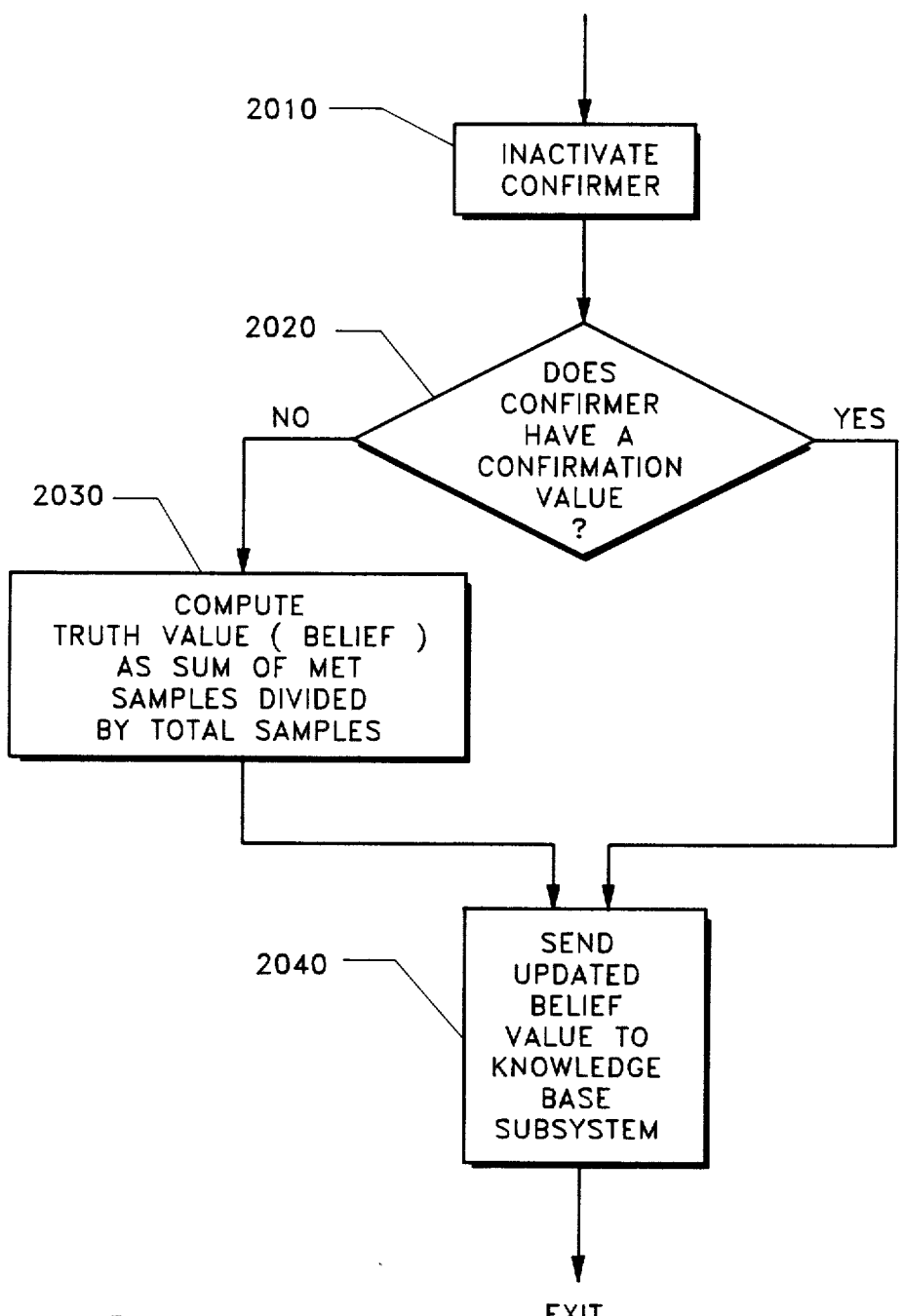
FIG. 20 illustrates a flow diagram of the routine for the "deactivate expectation" handler.

FIG. 20 illustrates the flow diagram for the "deactivate expectation" handler. In this case, the confirmer is deactivated (block 2010), and inquiry is made (diamond 2020) as to whether the confirmer has a confirmation value. As noted above, it will have such a value only if it happens to have met the requirements which would be the same as the requirements for a corresponding detector. If it does, then the block 2040 is entered, this block representing the sending of the confirmation value as an updated belief value to the knowledge base subsystem. If the confirmer does not already have a confirmation value, the block 2030 is entered and a truth value (belief level) is computed as the sum of "met" samples divided by the total of samples viewed by the confirmer. The result is stored in the "Truth Value" slot (FIG. 5), and sent to the knowledge base subsystem (block 2040). Further discussion of the use of belief levels is set forth in the description of the knowledge base subsystem operation.

As previously indicated, the knowledge base subsystem 150 (FIG. 1) contains relationships between observations (made via the observer subsystem 120) and situations which can be inferred from the observations. One of the knowledge base subsystems, 160, is called an "OSR" ("observation situation relation") knowledge base, and the structure and operation of the present embodiment of this knowledge base will now be described. Objects identified as "Observations" and "Situations" are building blocks of the knowledge base, and they are connected with "Relations" objects to construct networks to model the behaviors of interest.

Figure 21:
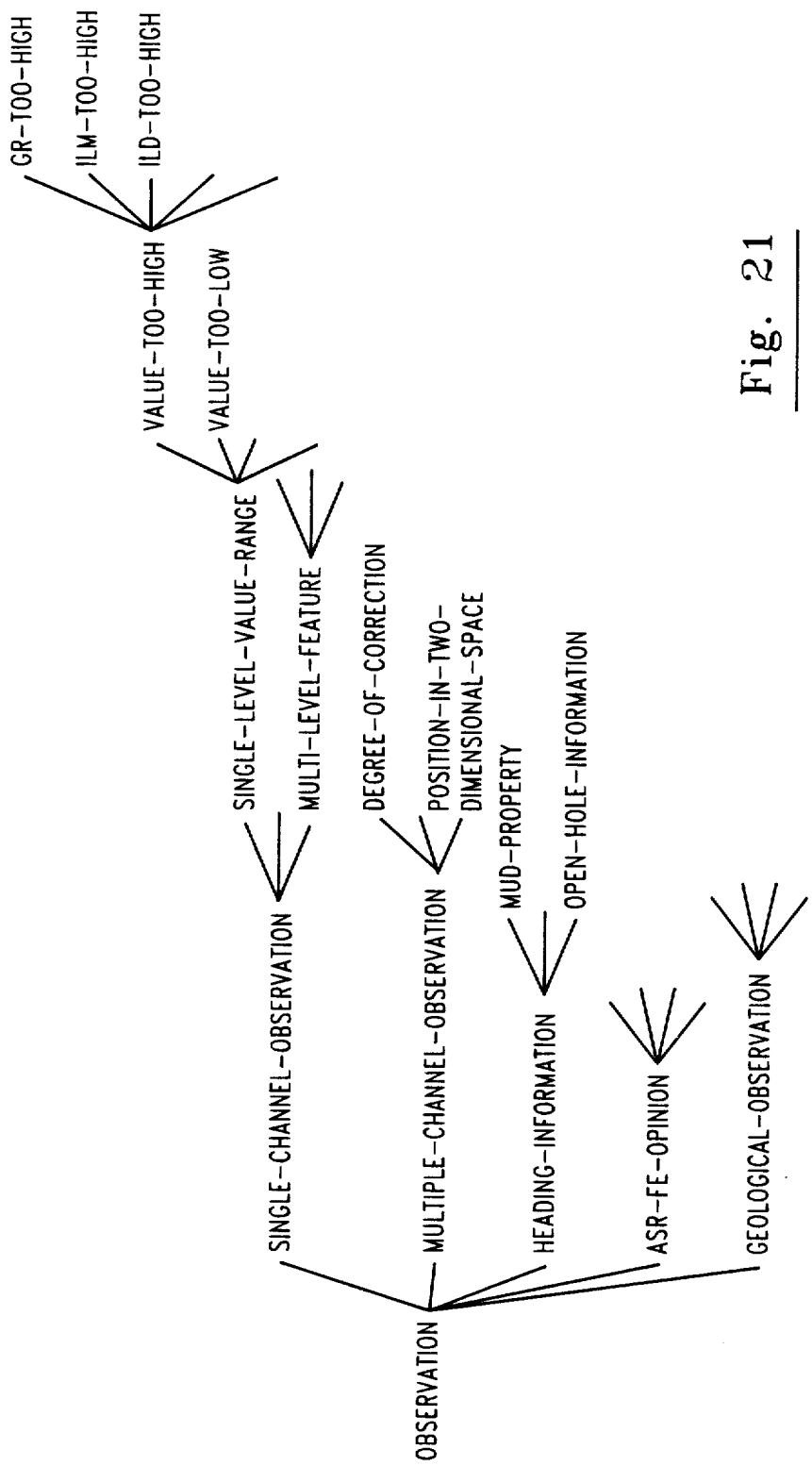
FIG. 21 is a simplified diagram of the class lattice for "Observation" in the OSR knowledge base subsystem.

As above, an Observation, as used in this system is a feature that can be identified in the logging data. A Situation describes a state of the subsurface (formations and/or borehole) and/or the logging equipment and interactions between the tools and the downhole environment. Observations and Situations are organized taxonomically; i.e., in a class lattice. For example, as seen in the simplified diagram of FIG. 21, the most general object "Observation" has subclasses identified as "Single Channel-Observation", "Multiple-Channel-Observation", "AskFEOpinion", and "Geological-observation". These subclasses, in turn, have other subclasses, as shown in the Figure. At the rightmost level are observations such as "Gr-too-high", ILM-too-high" etc. The property of inheritance is again present, and can be described, for example, with "is-a" connections. For example, in FIG. 21, "GR-too-high" is-a "Value-too-high" is-a "Single-level-value-range" is-a "Single-channel-observation". Any relevant properties of "Single-channel-observation" will be inherited ultimately by "GR-too-high" (which happens to pertain to the observation of an unduly high output of a gamma ray (GR) logging device).

Figure 22:
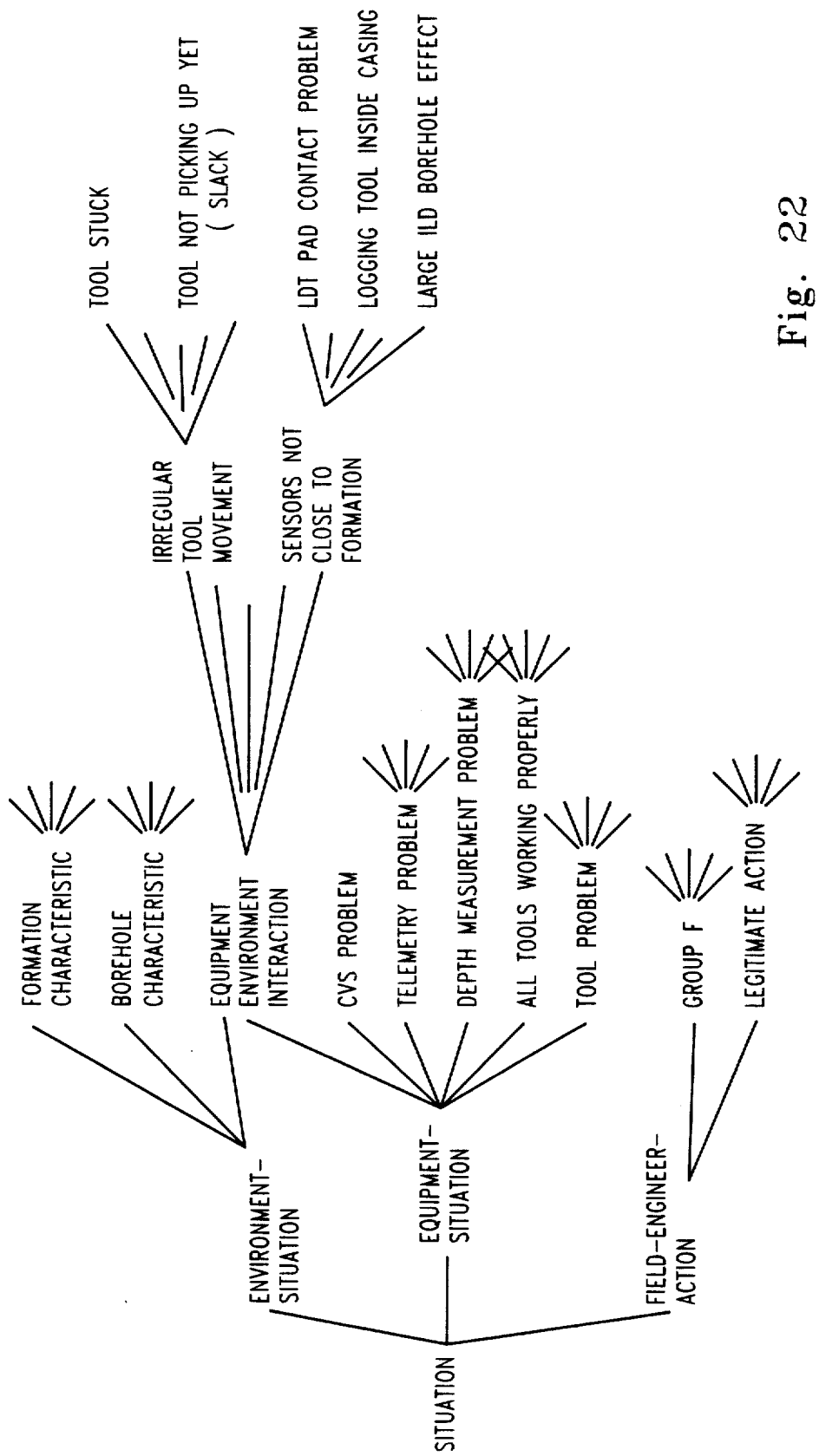
FIG. 22 is a simplified diagram of the class lattice for "Situation" in the OSR knowledge base subsystem.

FIG. 22 shows a similar type of class lattice (again, simplified) for the "Situation" taxonomy as used in the present embodiment. For example, "Tool-stuck" is-a "Irregular-tool-motion" is-a "Equipment-environment-interaction" is-a "Equipment-situation", and any relevant properties of the object "Equipment-situation" will be inherited by "Tool-stuck". [In this example it can be noted that "Environment-situation" is also a parent class of "Equipment-environment-interaction".]

Figure 23:
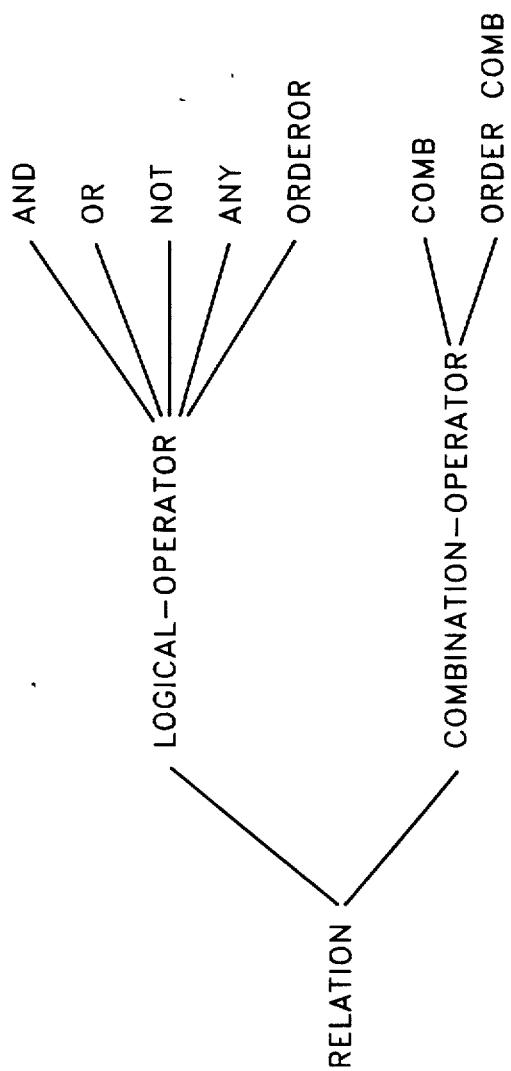
FIG. 23 is a simplified diagram of the class lattice for "Relation" in the OSR knowledge base subsystem.

To encode the cause and effect between Observations and Situations, they can be connected by Relations. The class lattice for some of the types of Relations that can be used in the present embodiment is shown in FIG. 23.

In general, operation of the OSR network proceeds as follows: All top-level Situations that can explain a particular detected Observation are found. Confirming evidence is then gathered by traversing the network for each such Situation. The Situation with the highest "belief level" can then be concluded to be the best current explanation for the triggering observation.

Figure 24:
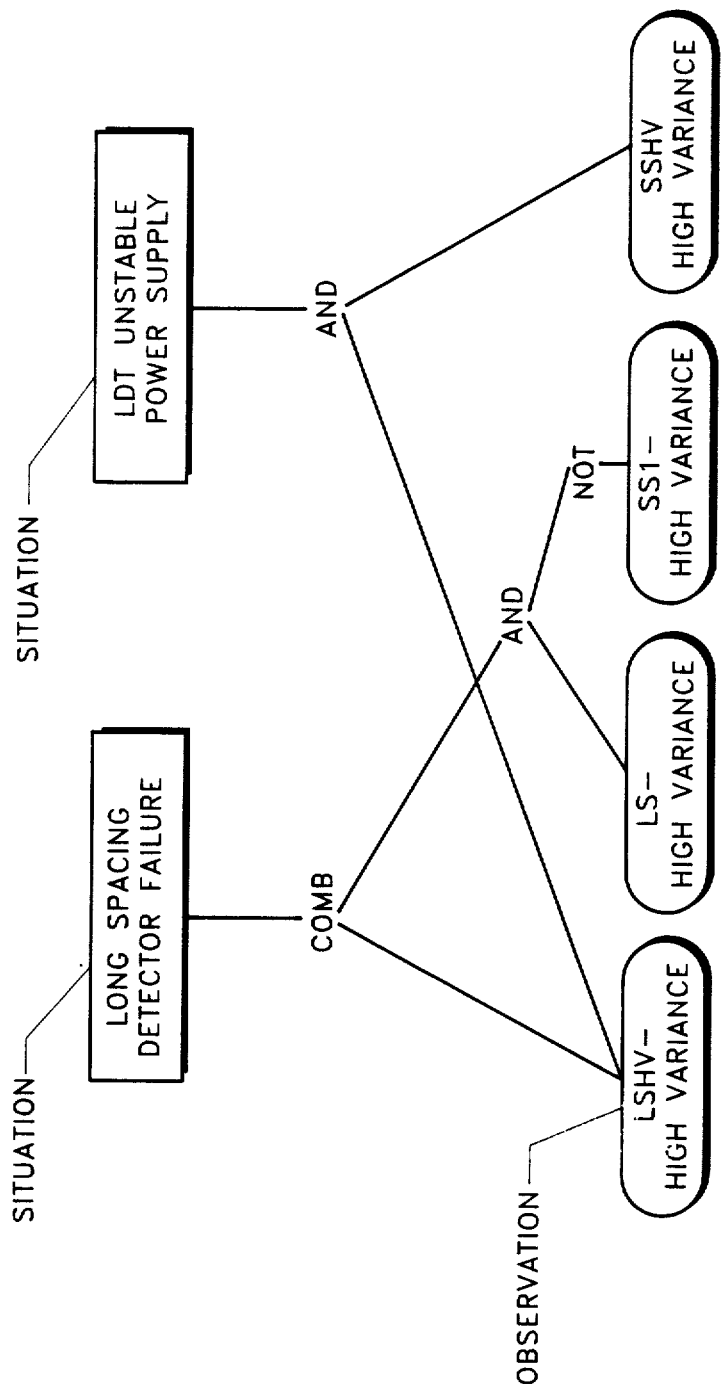
FIG. 24 illustrates a simplified example of the functioning of the OSR network.

A simplified example of the functioning of an OSR network is illustrated in FIG. 24. Assume that an observation is detected in the observation module 120 (FIG. 1) that "LSHY-high-variance" has occurred (in other words, the high voltage reading of the long spacing detector of the "LDT" [Litho-density] logging tool is varying more than it should). The sysem "knows" that if the SSHV reading (the high voltage reading of the short spacing detector of the same logging tool) is not erratic (as would be indicated if a confirmer set up in the observation module 120 to observe "SSHV-high-variance" resulted in a "not confirmed" report), then a "Long Spacing Detector Failure" is likely. Using the OSR network structure, the system can also conclude that there has probably not been an "LDT Unstable Power Supply" failure, because such a situation would require both "LSHV-high-variance" and "SSHV-high-variance" to have occurred (i.e. to have "confirmed" beliefs). In this case, therefore, the Situations associated with the original detected observation ("LSHV-high-variance") are determined to be "Long Spacing Detector Failure" and "LDT-unstable-power-supply". The belief levels of these Situations are then inferred using the underlying network structure. [The inferences referred to are a simplification for ease of explanation. The diagram also indicates that the Observation "LS-high-variance" ANDed with the inverse of the Observation "SS1-high-variance" is combined ("COMB") with "LSHV-high-variance". Thus, with appropriate relative weightings assigned in the network, as will be further described, numerical and/or quantized belief levels can be obtained for each of the two Situations, and these belief levels can be reported as output inferences.]

In the example just set forth, the Relations used are in conventional boolean notation, and answers could be considered as being in "true/false" mode; i.e., inferred beliefs are either considered as "confirmed" or "not confirmed". However, many of the relationships between Observations and Situations in the network in the present embodiment lend themselves better to evaluation based on more flexibly represented levels of belief, and upon use of variable weightings in employment of Relations. For example, in FIG. 24, it may be that one of the observations LSHV-high variance or SSHV-high variance is substantially more important than the other observation in evaluating the possiblility of the Situation "LDT Unstable Power Supply". As a further example, the nature of the Observations and their relationship to the Situations may typically be such that the level of belief regarding the Situation "Long Spacing Detector Failure" may be other than "confirmed" or "not confirmed"; the actual level of belief lying somewhere in between. To implement this greater flexibility of representation and computation, the present embodiment of the invention utilizes a form of what is sometimes called "fuzzy logic" (see, for example, "Making Computers Think Like People", L. A. Zadeh, IEEE Spectrum, Aug., 1984, p. 26–32) wherein weightings can be attributed to the operands of Relations, and wherein inferred belief levels can be numerically computed and expressed. In the present embodiment, the belief levels are numerically computed and quantized, and the relative weights are also quantized.

Figure 25:
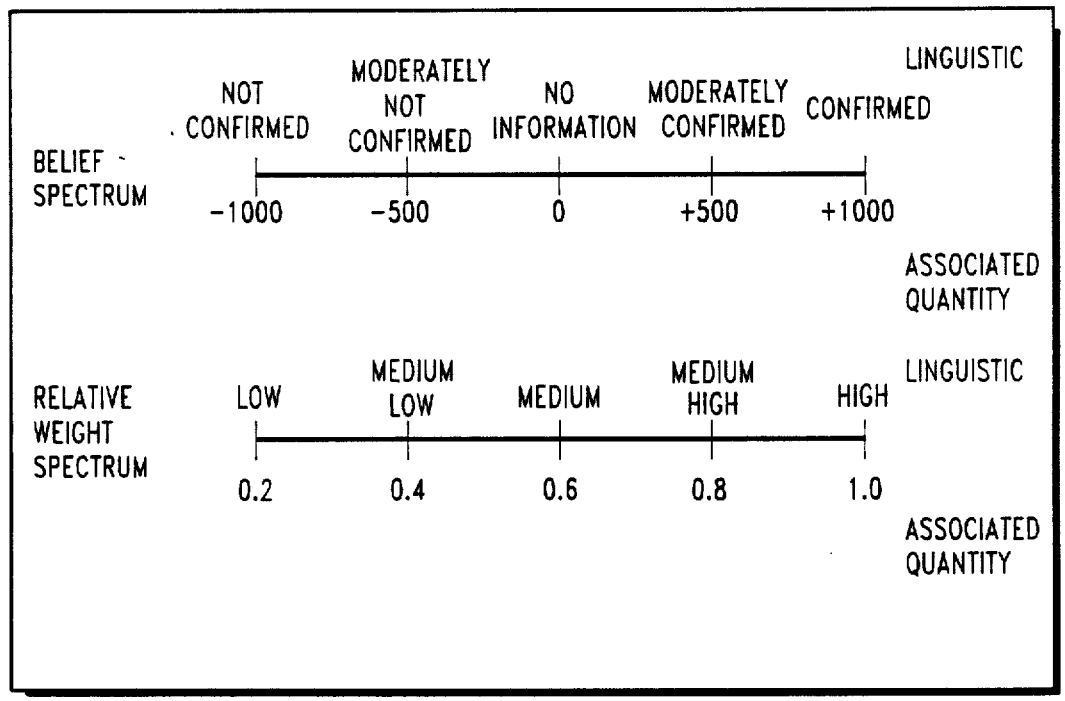
FIG. 25 shows graphs of belief level and relative weight.

To understand the type of inference logic approach used in the present embodiment, reference can be made to FIG. 25. In the Figure, there is shown a graph of "belief" levels, there being defined five belief levels with associated numerical values. The rightmost and leftmost belief levels are called "confirmed" and "not confirmed", and these have numerical values of 1000 and −1000. In the center is a belief level called "no information", with an associated numerical value of 0. Half-way between "confirmed" and "no information" lies "moderately confirmed", with a numerical value of 500. Also, half-way between "not confirmed" and "no information" lies "moderately not confirmed", with an associated numerical value of −500.

The second graph shown in FIG. 25 illustrates a convention for relative weights which is used in the present embodiment. The weights on the graph from left to right, are designated as "low" (with a corresponding weight of 0.2), "medium-low" (with a weight of 0.4), "medium" (with a weight of 0.6), "medium-high" (with a coresponding weight of 0.8), and "high" (with a corresponding weight 1.0).

The rules used in the present embodiment for various Relations are as follows:

"AND" will output the minimum one of its input weighted beliefs, with the proviso that if it computes a weighted belief from an input that is equal to the absolute minumum belief, it will output that weighted belief without the need for considering its further inputs;

"OR" will output the maximum one of its input weighted beliefs, with the proviso that if it computes a weighted belief from an input that is equal to the absolute maximum belief, it will output that weighted belief without the need for considering its further inputs;

"ANY" will output the maximum one of its input weighted beliefs, with the proviso (in addition to that noted for "or") that its first level inputs are checked for a sufficient weighted belief before the usual expansion of the search takes place, and if any of these adjacent inputs has a positive belief greater than a predetermined threshold, it will output that weighted belief without the need for further search;

"NOT" will output the negative of its input belief.

"COMB" will output the sum of its input weighted beliefs.

Figure 26:
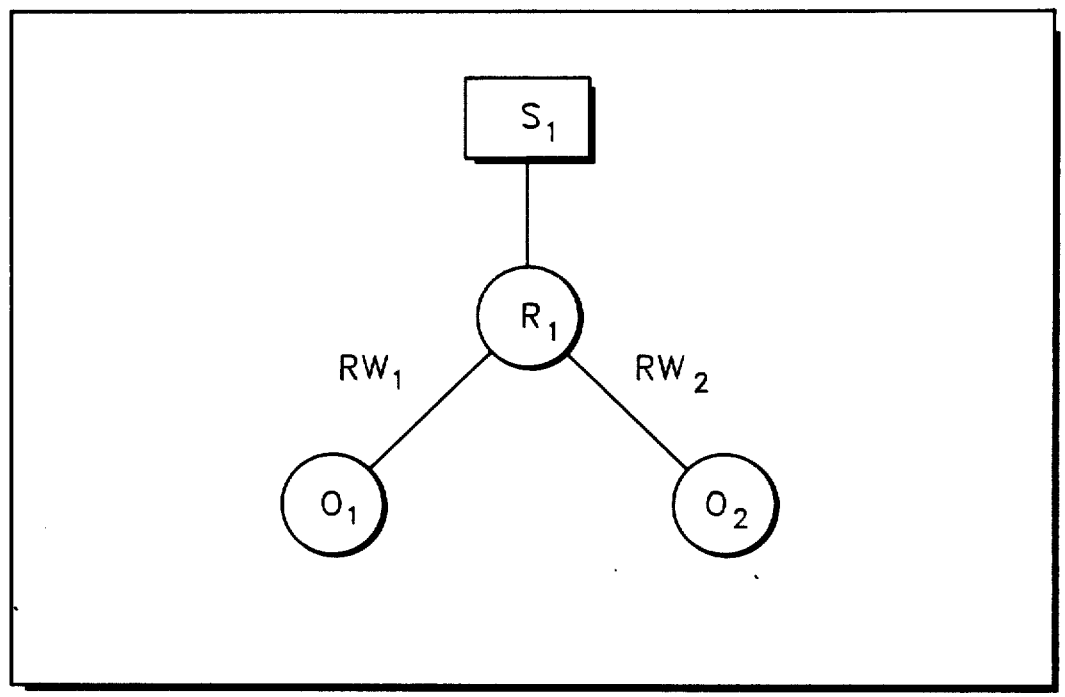
FIG. 26 is a simplified diagram illustrating the function of Relations in the present embodiment.

FIG. 26 can be utilized to better understand the use of the system of belief levels and relative weights employed in the present embodiment of the invention. $O_1$ and $O_2$ represent two Observations that are connected to a Situation $S_1$ via Relation $R_1$. It is assumed that the relative weightings of $O_1$ and $O_2$ at this Realation are $w_1$ and $w_2$, respectively. As a first example, assume that the Relation is an "AND", $O_1$ has a confirmed belief (1000) and a medium-low weight ($w_1 = 0.4$), and $O_2$ has a moderately not confirmed belief ($-500$) and a medium-high weight ($w_2 = 0.8$). [Note that the relative weights need not add up to unity, as when dealing with probabilities.] For this example, we should have:

$$(O_1) \text{ AND } (O_2) = \text{min. of } (1000)(0.4), (-500)(0.8)$$
$$= -400$$
$$= \text{moderately not confirmed}$$

As noted above, the result can be used in numerical form, or can be quantized, as in the present case, wherein the closest listed belief of the table is considered to be the computed belief level. If the relation in FIG. 26 was an "OR", we would have:

$$(O_1) \text{ OR } (O_2) = \text{max. of } (1000)(0.4), (-500)(0.8)$$
$$= 400$$
$$= \text{moderately confirmed.}$$

For the case of the Relation being a COMB, we would have:

$$(O_1) \text{ COMB } (O_2) = (1000)(0.4) + (-500)(0.8)$$
$$= 0$$
$$= \text{no information.}$$

It will be understood that the described convention of Relations, while used to advantage in the present embodiment, can be varied, and most aspects of the present invention do not depend upon use of a particular convention for Relations.

Figure 27:
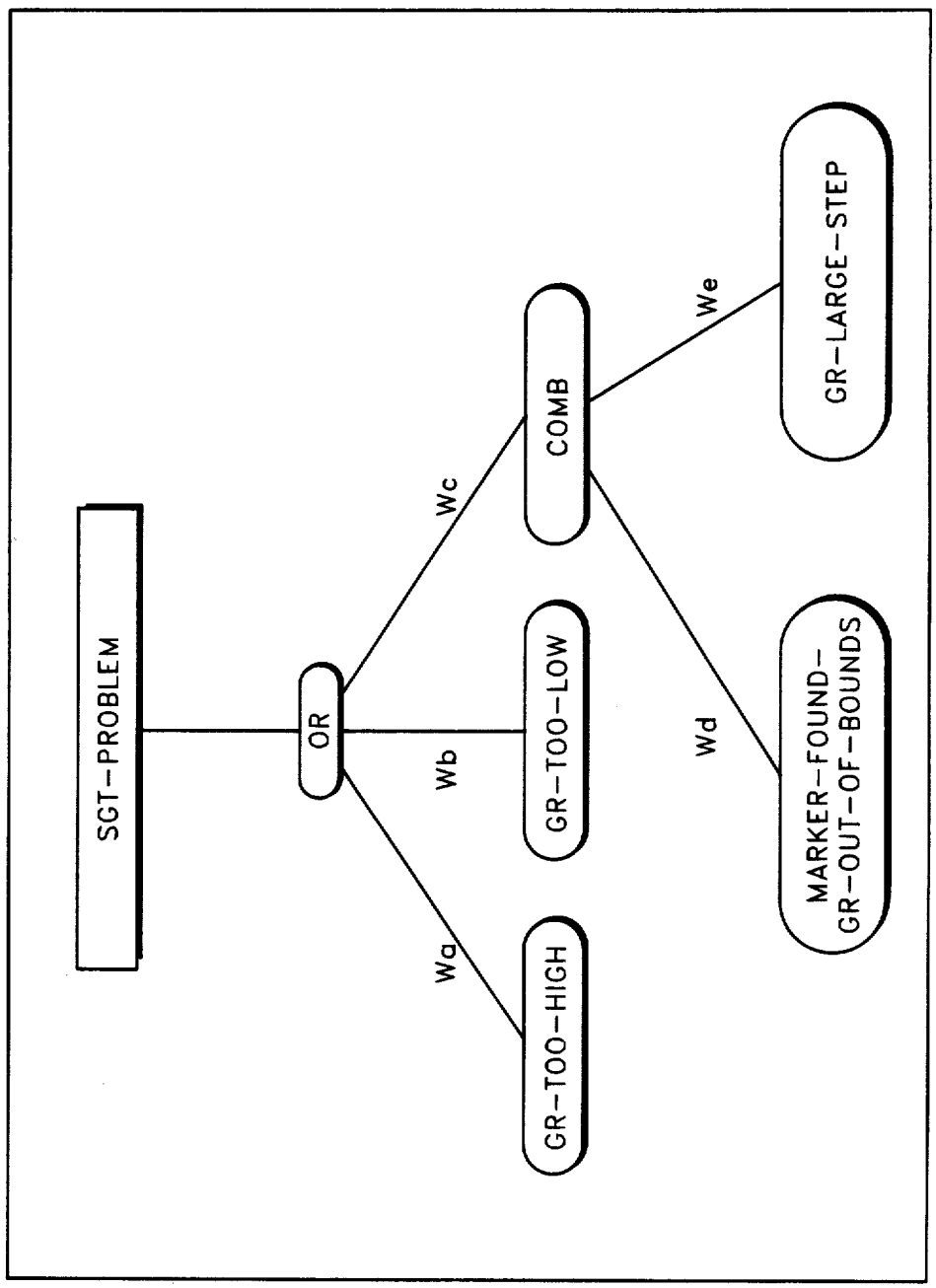
FIG. 27 is a diagram of a simplified portion of an OSR network.
Figure 28D:
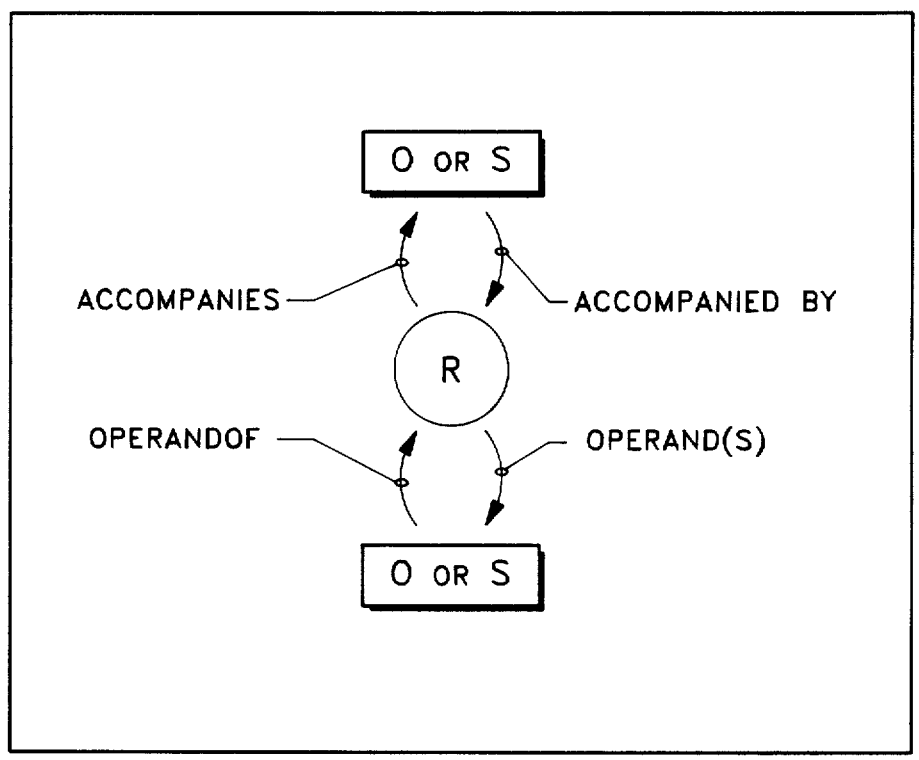

In constructing the described OSR network, expert information concerning the relationships between situations and observations in incorporated into the stored OSR network using Observation, Situation, and Relation objects (see exemplary class lattices of FIGS. 21-23), the objects being linked together in a manner which facilitates both the formulation and the use of the network. In the present embodiment, each object in the network has slots which point to the other object or objects (if any) to which said each object is contiguously linked in the network. For example, consider the simplified portion of network shown in FIG. 27, which represents a Situation called "SGT-problem", Observations called "GR-too-high", "GR-too-low", "Marker Found-GR-out-of-bounds" and "GR-large-step", and the Relations called "OR-0127" and "COMB-0126". The Observations are connected to the Situations via the Relations in the configuration shown in the Figure, this having been determined by the opinion of people experienced with the behavior of gamma ray logging tools. As also seen in the Figure, each branch input to the Relations has an associated weighting which, again, would be based on experience regarding the relative significance of each belief input to the Relations of this portion of the network. FIGS. 28A, 28B and 28C respectively illustrate window views of examples of objects which are created when formulating the portion of network shown in FIG. 27. Typically, these objects may be created using the editors 180 (FIG. 1), although any suitable means of object creation can be employed.

FIG. 28A illustrates some of the pertinent slots (for the present explanation) for the object "SGT-problem". [The objects will have various other slots pertaining, for example, to items such as depth level, as appropriate.] It is seen that this object is a Situation, and that it has slots called "Accompanied By:" and "Accompanies:" These slots contain pointers which indicate the links between this object and other objects in the network to which it will be linked. As seen in FIG. 27, this particular object is only linked in one direction; i.e., to the Realation "OR-0127" (where the numerical part is merely to identify and distinguish this particular Relation object). Accordingly, when creating this Situation object in the network, its slot "Accompanied by:" has "OR-0127" inserted therein, and the "Accompanies:" slot is left empty.

FIG. 28B illustrates the object which can be created for the Relation "OR-0127". As seen, this object "is a" Relation. The slot called "Operands:" has inserted therein the names of the Observation objects that are to be coupled to this Relation in the piece of network being constructed, and the weighting associated with each such Observation object is also indicated in this slot. The slot called "Accompanies:" is provided with the name of the object to which the Relation object is linked above; namely, the Situation "SGT-problem". [Reference can be made to FIG. 29 to understand the convention which determines when the terms "accompanies", "accompanied by", "operand" and "operand of" are used as the slot names.]

In similar manner, FIG. 28C illustrates the object to be created for "COMB-0126" which is a "Relation. This object has slots "Operands:" and "Accompanies:" which, again, have inserted therein the objects (and relative weights, where appropriate) to which this Relation is linked from below and from above.

As noted above, a "graph traversal" approach can be employed in using the OSR network hereof. Before this is done, it is useful to set up a pretraversal organization of objects to be traversed, which is facilitated by the described linking of objects in the network.

Figure 29:
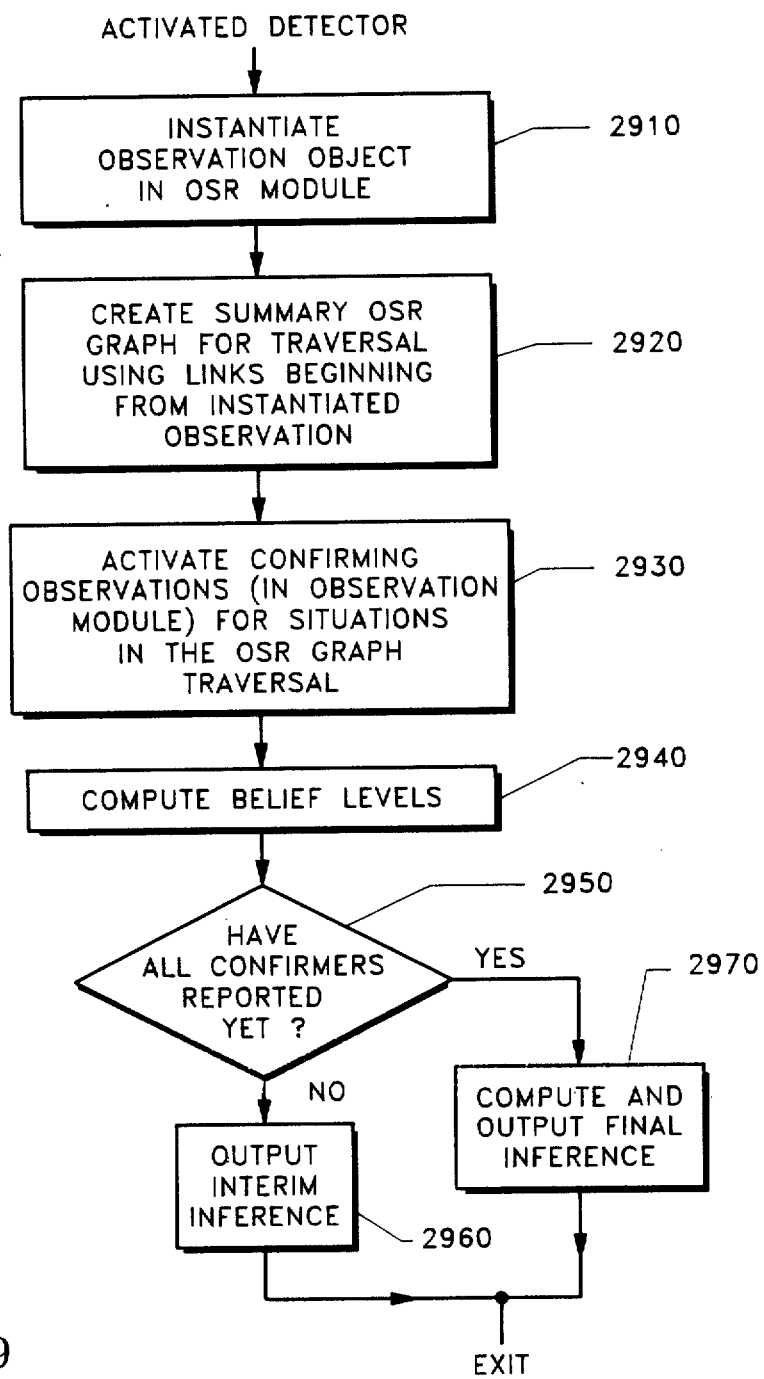
FIG. 29 is a flow diagram of the controlling routine for operation of the OSR knowledge base.

Referring to FIG. 29, there is shown a simplified flow diagram of the controlling routine for operation of the OSR knowledge base 160. When a detector has been activated, the appropriate Observation object is instantiated in the OSR subsystem, as represented by the block 2910. A summary of the OSR graph traversal is then created, utilizing the links between objects, as previously described, and beginning from the instantiated Observation. This is represented by the block 2920. Confirming observations are then activated in the observation module 120 via the "activate expectation evaluator" message handler in the corresponding confirmer object, for those Situations in the OSR graph traversal, as represented by the block 2930. The block 2940 is then entered, this block representing the computing of belief levels for the Situations in the OSR graph traversal. Inquiry is then made (diamond 2950) as to whether all confirmers have reported as yet. If not, the block 2960 is entered, this block representing the outputting of an interim inference, based on the presently available information. When all confirmers have reported, the same is done (block 2970), but without the qualification that it is an interim inference.

Before describing the structure and operation of the local geology knowledge base subsystem 170 (FIG. 1), a summary of operation will be set forth. First, the marker or markers of interest must be defined, typically based on knowledge of beds which can be correlated throughout the field in which the present well is located. This information, which includes a depth location range and expected lithology, will generally be formulated and available beforehand, and the logging engineer will have a chart and list defining all known markers. The logging engineer will "post" the appropriate markers in the local geology knowledge base subsystem. Basically, this involves selecting appropriate ones of the markers which are located within the depth range to be logged, and inputting to the system the information concerning said markers.

When the logging operation begins, there is a logging depth detector which is set up to determine when the logging devices are within the expected range of each marker. When this occurs, a detector is activated in the observation mocule 120 to run only over the expected range. This detector monitors the response of a particular logging device and identifies candidate beds which could be the marker (or part of the marker). When a candidate bed is found, so-called "subordinate observers" are also set up to monitor further characteristics of the candidate bed; namely, log readings of logging devices in addition to the logging device used to identify the candidate bed. These log readings will be used to screen the bed candidates to see if they have most of the important characteristics of the marker being sought. [It will be understood that bed candidates for other markers may be identified at the same time this is going on.] If the bed passes this screening (by being found to produce log readings from the subordiante observers than are reasonably within the expected ranges) it is put on a 37 possibities" list.

When the logging depth detector indicates that the bed detector for this marker has passed outside the expected range of the marker, a marker identification procedure is begun. In recognition that a given marker may be "streaked" with beds of a different lithology, the possibilities on the list for the marker are combined, using a rule to be described, to obtain "combined possibilities" groups of beds. A determination is when made as to whether each "combined possibilities" group has a thickness that is consistent with the expected thickness of the marker. If none of the "combined possibilities" groups meet this criterion, a conclusion is drawn that the marker has been "missed". If there are one or more "combined possibilities" groups which meet this criterion, however, the one having the log responses which are closest to the expectations for the marker is selected as being the "found" marker. The conclusion as to whether the marker has been found, where it was found, and whether each log reading was within expected range, can then be reported to the user interface 110 and to the OSR knowledge base 160.

The structure and operation of the local geology knowledge base module will now be explained in further detail, followed by description of the flow diagrams (FIGS. 35 through 39) for implementing the routines involved.

Regarding marker bed definition, a marker bed will be restricted to a bed which: (a) can be correlated, (b) is reasonably thick, and (c) has nearly constant log responses over a large area. The last condition means that the lithology should remain the same over the area of interest. Once a bed has been selected as a "marker", its characteristics must be encoded and stored in the knowledge base. There must be enough parameters to describe the marker unambiguously, but they must be selected in a manner that allows the marker to be detected successfully in all wells in the area. In the local geology knowledge base of the present embodiment, a marker bed is characterized by depth, thickness, log values and maximum streak thickness. Each parameter except the last one is defined as a range of values. The depth parameters correspond to the shallowest and deepest top for the marker. The thickness parameters correspond to the minimum and maximum expected thickness. Each log is assigned a minimum and maximum value. For instance, in a tight lime the density range might be 2.68 to 2.72 g/cc, the neutron range $-1$ to 2 P.U., etc. The maxium streak thickness is the thickest streak of a different lithology that can be present within the marker. This gap may be caused, for instance, by an anhydrite streak within a massive halite bed, or a sand within a shale. The definition of a marker also includes which log is to be used for zoning (bed identification).

Figure 30:
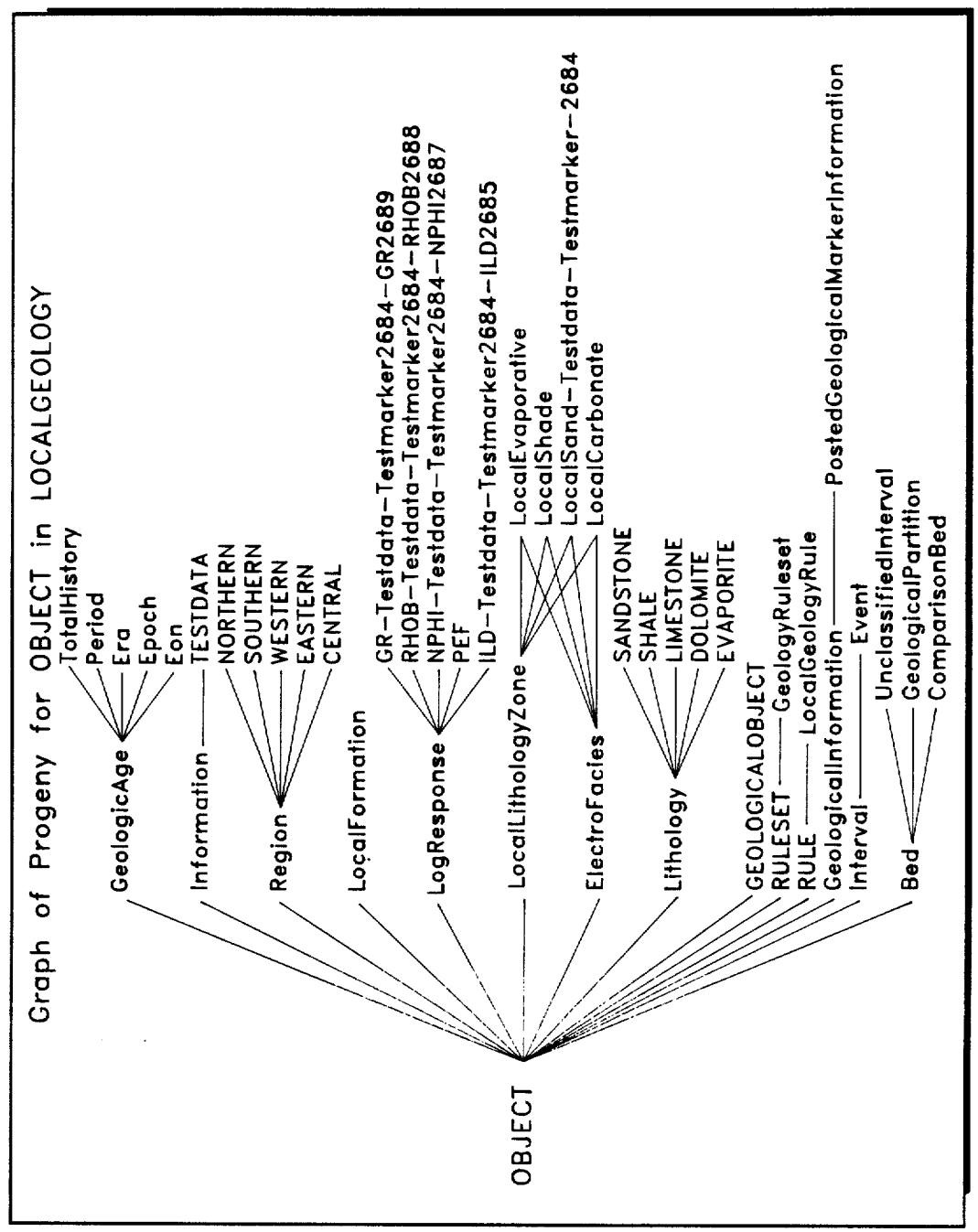
FIG. 30 illustrates part of the class lattice for an object in the local geology knowledge base.

FIG. 30 illustrates part of the class lattice for an object in the local geology knowledge base. Two of the class objects are LocalLithologyZone and LogResponse. Local lithology zones are shown as four subclasses, LocalShale, LocalSand, LocalEvaporite, or LocalCarbonate. Default detectors and detecting channel names are stored in these subclasses. The illustrated log responses include the standard triple-combo logs gamma ray (GR), density (RHOB), neutron porosity (NPHI), photo-electric factor (PEF) and deep resistivity (ILD). Further logs (e.g. sonic) could be added by the creation of the appropriate subclass under LogResponse. The various "TESTDATA . . . " objects are instantiations which represent a marker (e.g. "TESTDATA-TESTMARKER-2684") or log response data for a marker (e.g. "TESTDATA-TESTMARKER-2684-GR-2689"). FIG. 31 shows an example of an instantiated marker definition object, and is seen to include slots which indicate the expected range and thickness of the marker, maximum streak thickness, and lithology. The detecting channel is indicated as being "RHOB"(a density log), and the detector to be used is indicated as being in the observer module knowledge base and having the name "RHOBLithBedDet". For convenience, the expected ranges for log values of GR, NPHI, PEF, and RHOB are shown in this object view in tabular form. These data will typically be individual log response objects to which the present object points (see e.g. progeny diagram of FIG. 30).

It can be noted that the local geology knowledge base need not contain a complete hierarchy of lithology types or regional rock stratigraphy units, and it needn't deal with geographic variations. For a marker whose log responses vary over a large geographic area, one could create several marker definitions.

Regarding bed identification, a "bed" can be considered as a vertical interval within which log values remain essentialy constant. Ideally, one might monitor all logs, and terminate a bed when any one of the logs starts to deviate from the nearly constant value it has assumed in the bed. However, to improve system efficiency, it is preferable to monitor as few logs as possible. Monitoring a single log (for initial bed identification) gives good results, provided this log is selected according to the lithology one is looking for.

For example, if the marker one is looking for is a halite bed, the neutron log would be a poor choice because any bed found with this log alone would likely to also include anhydrite beds which are often associated with halite. In this case, the density log would clearly be the best choice because the density of halite is quite different from the density of other rocks. The parameters defining a marker, therefore, include the log to be used for bed identification. Different markers may use different logs for bed identification. For instance, the resistivity log may be used to look for shale beds, while the photoelectric log is used to look for sand beds in overlapping intervals.

Figures 32, 33:
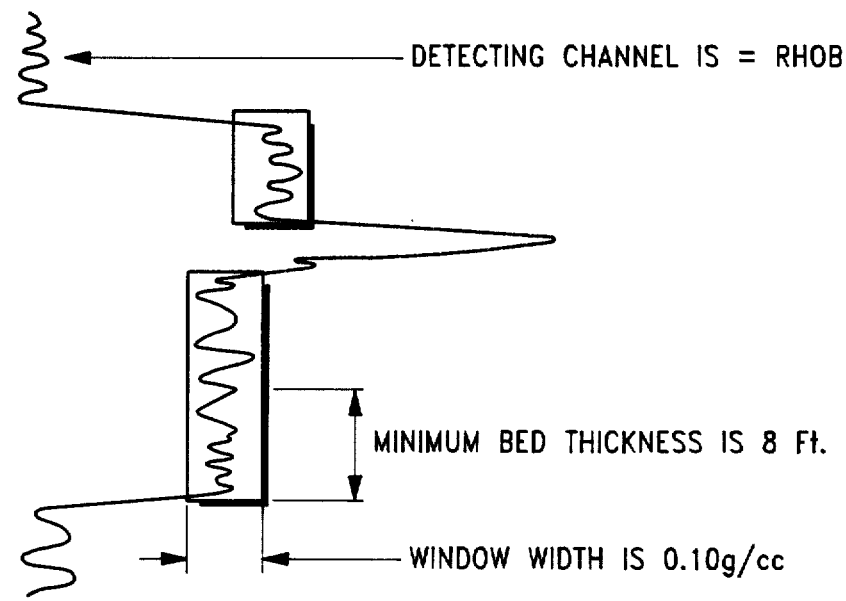
FIG. 32 illustrates a window view of pertinent slots of a detector object as used for a local geology bedding detector.
FIG. 33 shows the nature of the window width and height which can be used for an embodiment of a bedding detector.

The detector's definition includes the parameters log type and window width, the general nature of detectors having been described hereinabove in conjunction with description of the observation module 120. FIG. 32 shows some of the pertinent slots of a detector object, and FIG. 33 shows the nature of the window width and height which can be used for an embodiment of a bedding detector. The log type chosen for bed identification (density log, in this example) should be the one which shows the most contrast between the marker and adjoining beds. The window width is the maximum amount of log variation that is expected within a bed, i.e. the difference between the maximum and minimum log values. The parameter is set by compromise. If it is set too high, a bed may include different lithologies, and the mean log values computed on this bed may be rendered meaningless. If it is set too low, no beds may be found at all. For example, a small statistical variation on a nuclear log may terminate a bed before enough samples have been gathered to get past the minimum bed thickness.

The minimum bed thickness (or window height) is the minimum vertical extent of log that must be within the window width for a bed to be found. Again, this parameter is a compromise. If it is set too low, say two feet, many "beds" will be found, most of them being transition zones, not actual beds. If it set too high, say thirty feet, no beds may be found at all because formations are seldom perfectly homogeneous for large vertical extents. An example would be the density log (RHOB) with a window width of 0.1 g/cc, and a height of 8 feet to look for evaporites (FIG. 33).

As previously noted, the bedding detector is activated at the beginning of the interval where a marker is expected to appear. The starting depth is equal to the maximum depth for the top of the marker, plus the maximum thickness of the marker. The algorithm accumulates samples of the "detecting log" from that point for a distance equal to the window height. The minimum and the maximum log values within the window height are found, and it is determined whether they differ by less than the window width (0.1 g/cc). If this criterion is not met, the bottom sample in the window is discarded, one sample is added at the top, and the test is done again. When the test succeeds, the bedding attribute is considered to be present.

When a bed candidate has been identified, the mean value of each log over the bed interval is computed and stored. A decision is then made as to whether this bed may be part of the marker being sought. As described in conjunction with the flow diagram of FIG. 38, this decision is made by comparing the mean of bed log values with the marker log ranges. Log ranges are entered in the knowledge base as minimum and maximum. For internal computations, these numbers are converted to mean and standard deviations with the mean being the average of the entered values, and the standard deviation being one quarter of the minimum-maximum range. This assumes that the distribution within a marker is normal, and that the range as defined encompasses ninety-five percent of possible values. While this assumption may not always be strictly correct, it yields acceptable results in practice, and provides a practical means of computing distances in the log space.

In the present embodiment, the decision as to whether a bed can be classified as part of a marker is made in two steps: a coarse elimination first, then a more refined one. The selection criteria are intended to strike a balance between keeping too many beds and keeping none. If the selection rules are made very strict, markers would be found only if all logs are measuring correctly. This would defeat the purpose of identifying miscalibrated logs by detecting erroneous values in marker beds. If the selection rules are made too loose, markers would be found, but a miscalibrated log may pass all tests and be unnoticed. A bed may also be classified as being part of a marker it does not belong to. Adding such a bed to the marker is likely to skew log values, and could lead to the wrong conclusion that one or several logs are miscalibrated.

In the first candidate screening step, a bed in which any log response is very far from its expected value is discarded. To this effect, new log ranges are defined based on the log ranges given in the marker definition. These new ranges are centered on the same log values as the original ones, but are three times as wide (mean plus and minus six standard deviations). If any one of the log means in a bed falls out of its extended range, the bed is rejected as a candidate for the marker. The reason for this first sorting is to help differentiate lithologies that have similar log responses on most logs, but very different log responses on one log. For example, gamma ray, neutron and resistivity have similar log responses in both halite and anhydrite. The density log, however, has quite a different value in these lithologies. If any log was allowed to be very far out of range, an anhydrite bed might be included in a halite marker, with the erroneous conclusion that the density log is miscalibrated. It should be borne in mind that severe tool malfunctions would likely be caught by other detectors in the present system.

In the second candidate screening step, mean log values in the bed are compared to the original marker log ranges (mean plus and minus two standard deviations). If at least half the log means are within the bounds given for the marker, the bed is maintained as a candidate. This allows one or two logs to be slightly out of tolerance in any one bed. As described further hereinbelow, in many cases several beds are eventually combined together. When beds are combined, small log discrepancies tend to average out and only systematic errors remain.

Figure 34:
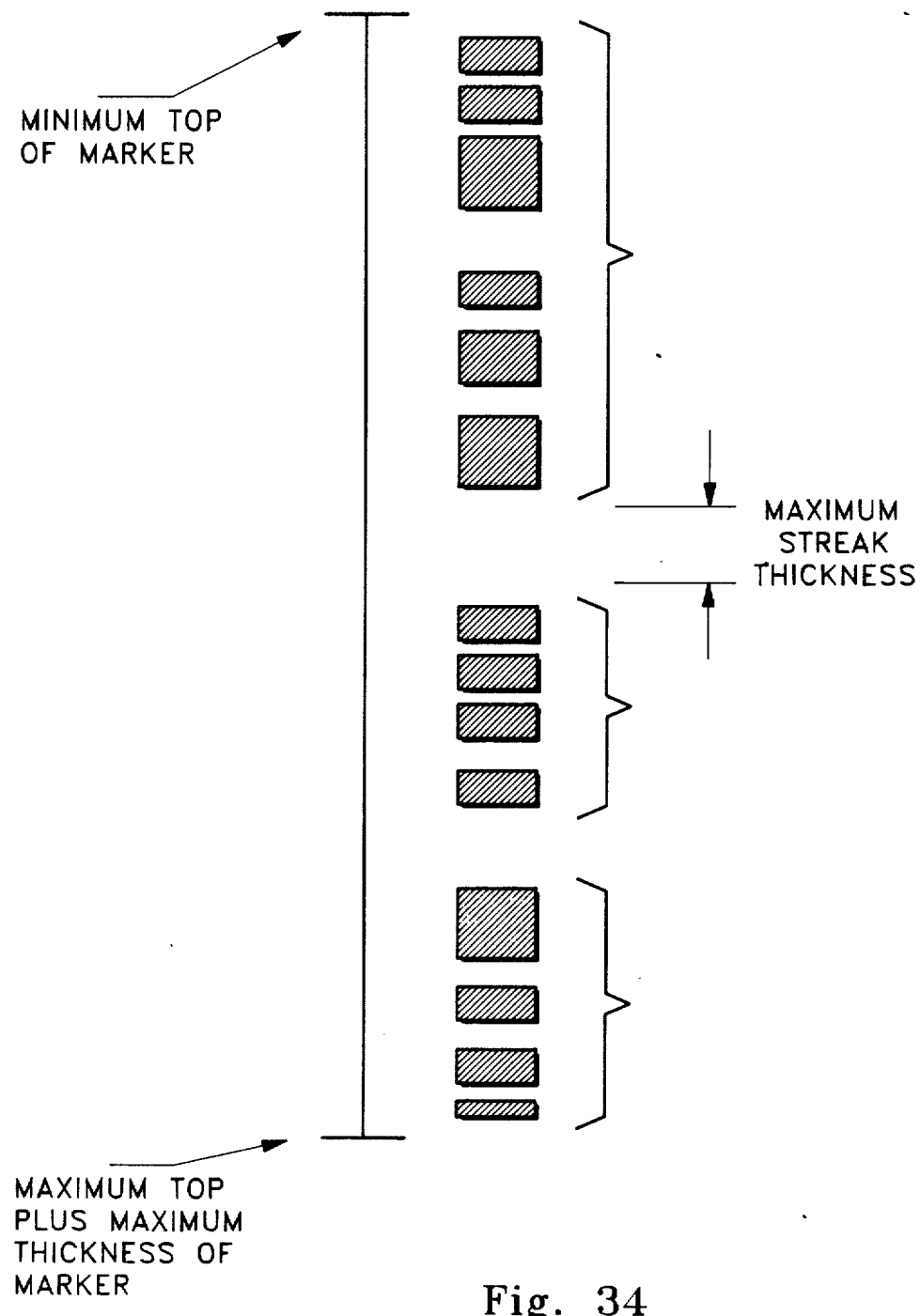
FIG. 34 is a diagram which illustrates the combining of condidate beds using maximum streak thickness.

Regarding marker identification, it is known that markers are seldom homogeneous from top to bottom. They are often interrupted by thin beds of other ligholo-gies. For instance, halite beds are cut by anhydrite streaks and massive sands are cut by shale streaks and vice versa. Few, if any, of the detected beds would therefore pass the thickness test for the marker. If every bed is thinner than the minimum thickness, the search for the marker would fail. Beds are therefore grouped (into "combined possibilities") and each group includes all candidates separated from each other by distances smaller than the maximum streak thickness. This is illustrated in FIG. 34, and the routine for implementation is described in conjunction with FIG. 39.

After beds have been grouped, the thickness of each group is tested. The total thickness of each "combined possibilities" group (from the top of the shallowest bed to the bottom of the deepest) must be within the minimum and maximum thickness declared for the marker.

If more than one "combined possibilities" group passes the thickness test, they are ranked according to the distance (in n-dimensional log space) from their mean log values to the mean log values of the marker. The group that yields the shortest distance is selected as the marker.

Referring to FIGS. 35-39, there is shown a flow diagram of the controlling routine for the described operation of the local geology knowledge base subsystem 170. As previously noted, certain operations can occur in parallel. Also, for object-oriented programming, as is preferred in the present embodiment, most of the indicated operations will be implemented in the context of message-sending between objects, as previously discussed.

Figure 35:
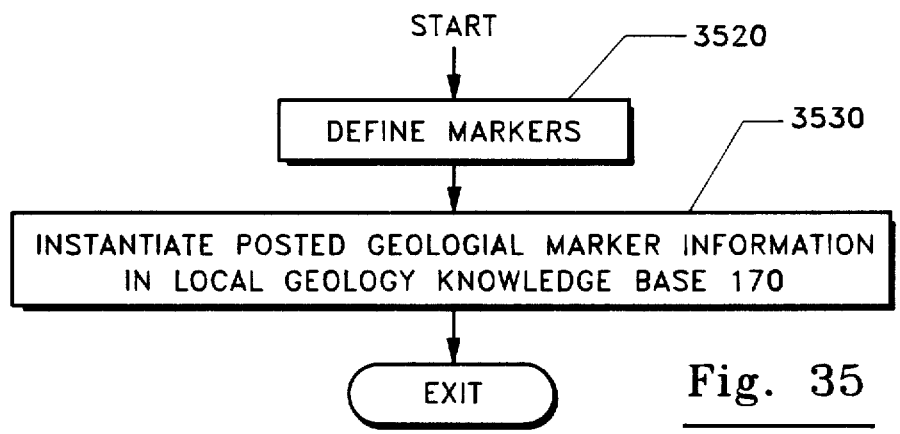

The diagram of FIG. 35 represents the setup phase, with the block 3520 indicationg the defining of markers, and the block 3530 representing the instantiation of posted geological marker information in the local geology knowledge base (see FIG. 31 above).

Figure 36:
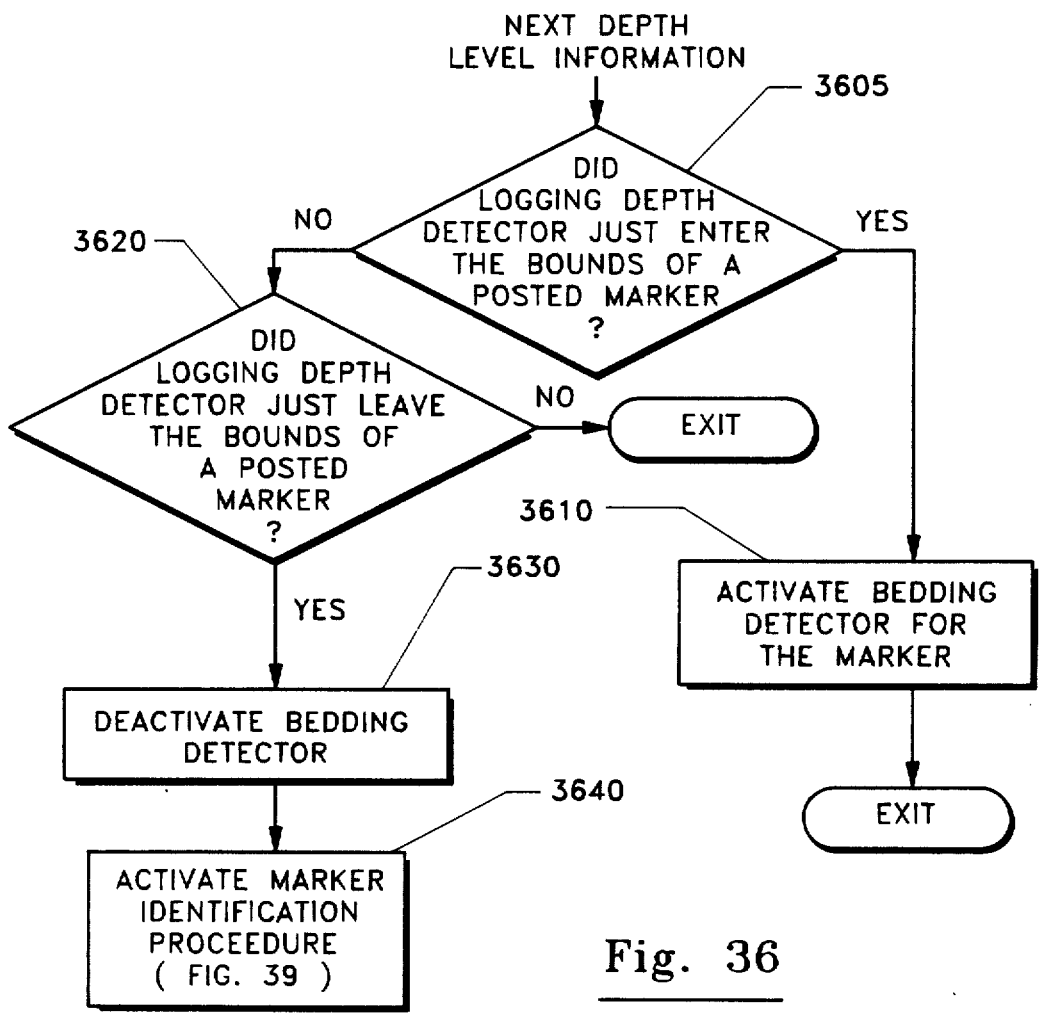

The flow diagram of FIG. 36 represents the routine for cotrolling activation and deactivation of the bedding detectors and initiation of the marker identification procedure. In the routine of FIG. 36, when the next depth level information is received, inquiry is made (diamond 3605) as to whether the logging depth detector just entered the bounds of the posted marker. If it did, the bedding detector for the marker is activated, as represented by the block 3610. If it didn't, inquiry is made as to whether the logging depth detector just left the bounds of a posted marker (diamond 3620). If not, nothing is done. If it did, however, the bedding detector for the marker in question is deactivated (block 3630), and the marker identification procedure (as described in conjunction with FIG. 38) is activated, as represented by the block 3640.

Figure 37:
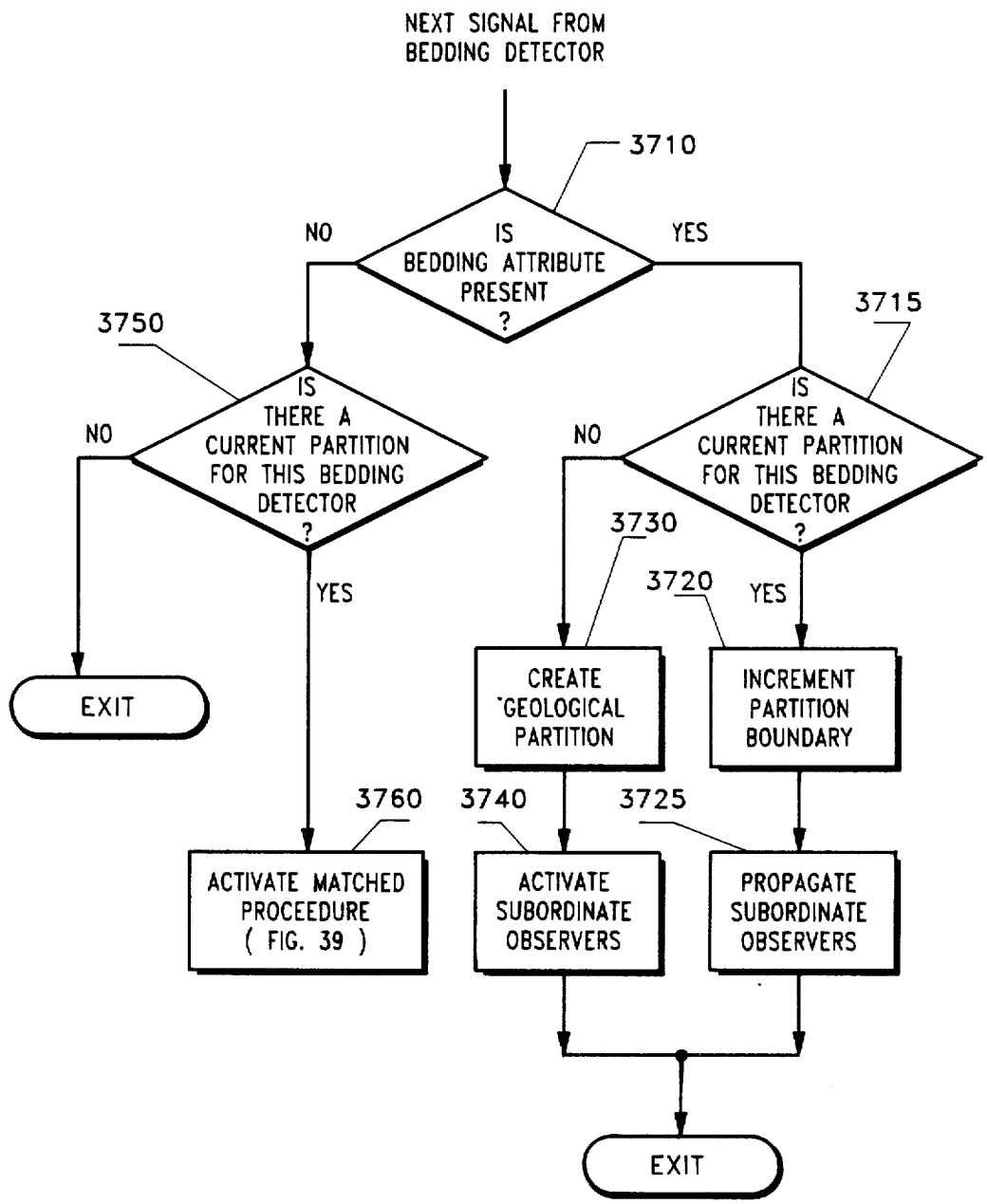
FIGS. 35-39 illustrate a flow diagram of the controlling routine for operation of the local geology knowledge base subsystem.

FIG. 37 shows the flow diagram of the routine for bed generation. The signal from the bedding detector for the bed being sought will indicate that the bedding attribute is either present or not present (diamond 3710). [It is again noted that a plurality of different markers may be sought simultaneously, using different detectors.] If the bedding attribute is present, inquiry is made (diamond 3715) as to whether there is a current partition for this bedding detector; in other words, was the bedding attribute present in the previous sample? If so, the partition boundary is incremented (block 3720) and any subordinate observers are "propagated", as previously explained, by incrementing the depth range over which their observations will be of interest (block 3725). If there is not a current partition, then one is created (block 3720), this being done, as noted above, by instantiating an appropriate bed object. Subordinate observers are then activated (block 3740). These are, for example, the associated logging detectors shown for the object illustrated in FIG. 31.

If the bedding attribute is not present in the lastest sample, then inquiry is made (diamond 3750) as to whether there is a current partition for this bedding detector. If not, nothing is done. If so, however, the current bed candidate is closed, and the match bed procedure of FIG. 38 is initiated, as described next. [It can be noted that it is not necessary to terminate the subordinate observers, since when the bed is closed, their depth boundaries will no longer be propagated, and they will shut off when they come to the last depth level of the bed, as recorded during previous propagation.]

Figure 38:
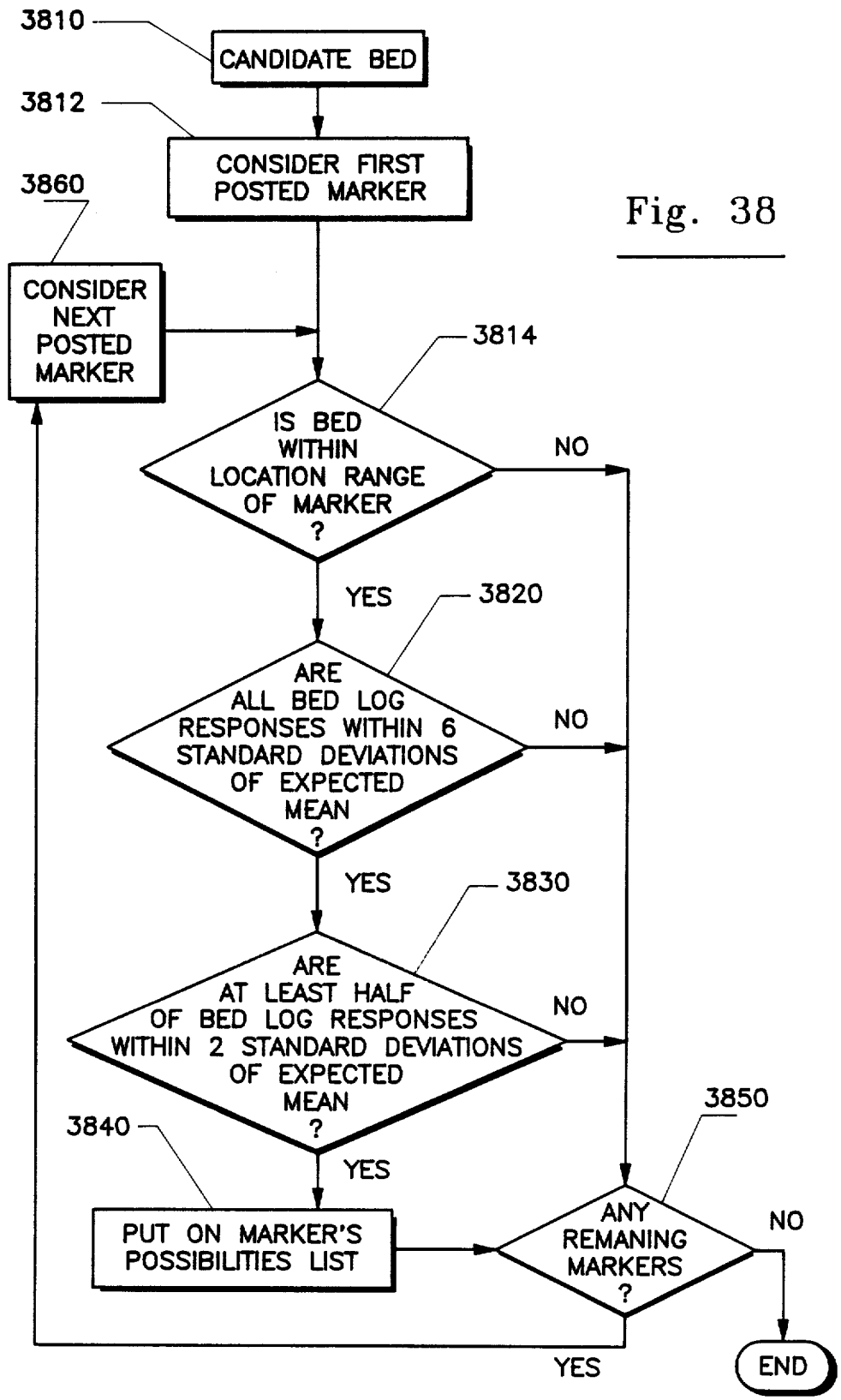

FIG. 38 illustrates the routine for the bed matching procedure. The attempt is made to match the detected bed (block 3810) with all markers whose location range encompass the bed (diamond 3814). For each marker that passes, inquiry is made as to whether all bed log responses are within six standard deviations of their expected mean, as represented by diamond 3820. If this test is met, then inquiry is made as to whether as least half of the log responses in the bed are within two standard deviations of the expected mean. The reasons for these successive tests were discussed above. If both tests are met, the bed is put on a "possibilities" list (block 3840), whereas if either test fails, the bed is not put on this list, as seen from the diagram. The next marker whose location range encompasses the detected bed is then tested (diamond 3850 and block 3860).

Figure 39A:
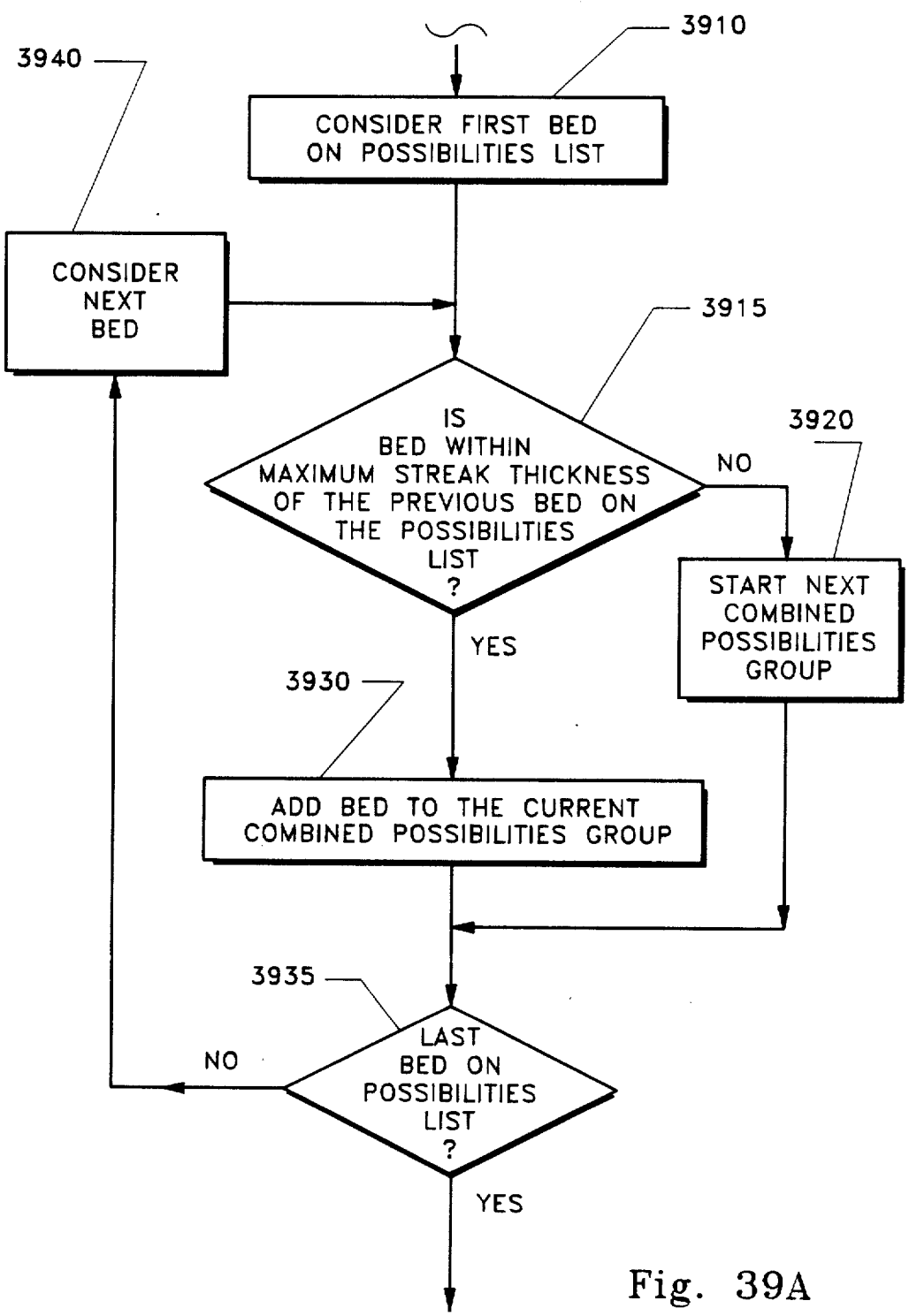
Figure 39B:
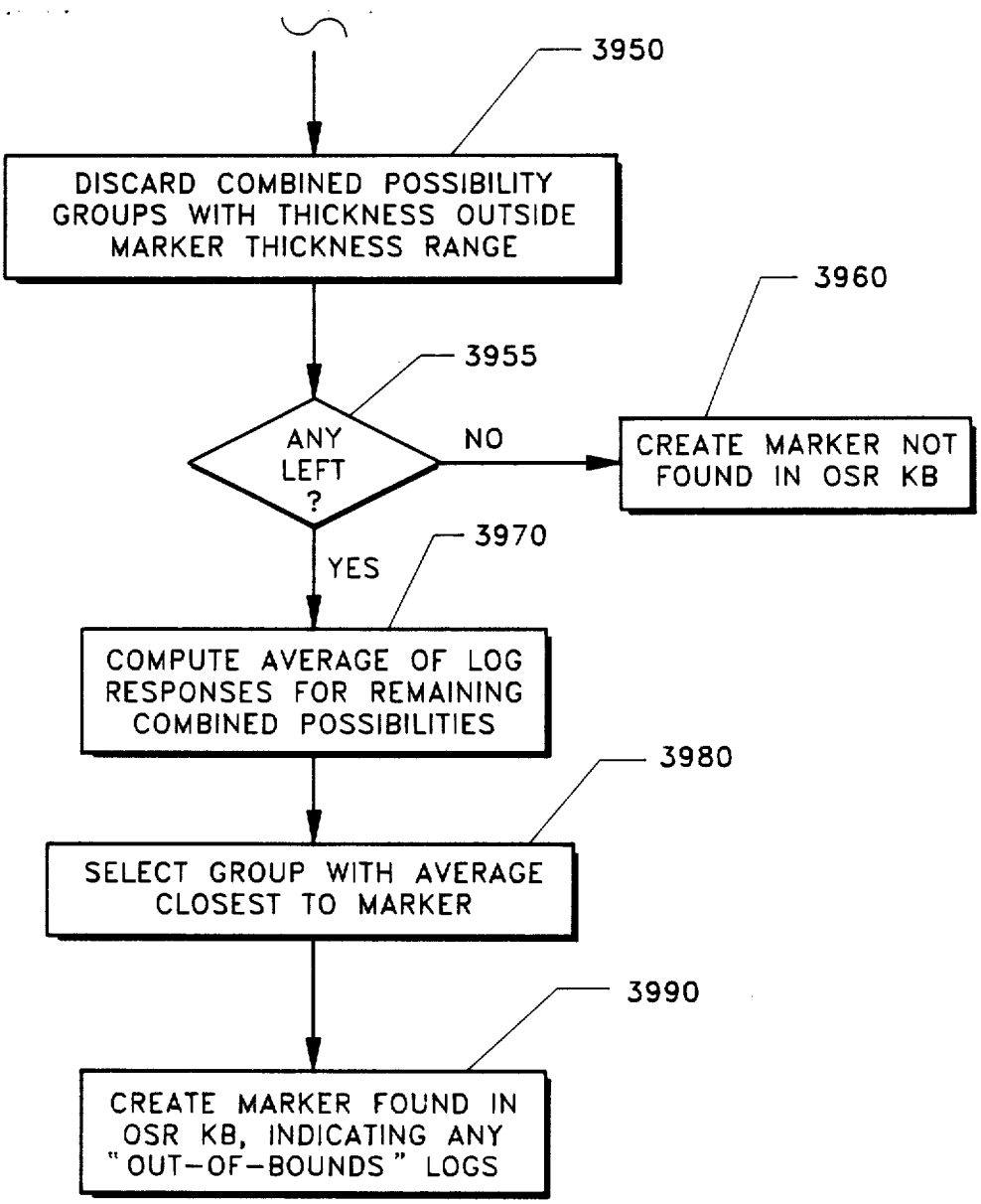

FIG. 39 illustrates the routine for marker identification. The portion of the routine which combines possible beds using the maximum streak thickness includes the blocks 3910, 3920, 3930 and 3940, and decision diamonds 3915 and 3935. As each bed is considered, its distance from the adjacent bed is tested (diamond 3915) to see if it is within the maximum streak thickness. If not, the bed is used to start the next "combined possibilities" group (block 3920). If it is within the maximum streak thickness, however, the bed is added to the current "combined possibilities" group (block 3930), and the loop 3941 continues until all beds have been combined, as appropriate.

In the next stage of the marker identification process, the thickness test is applied (block 3950) to each "combined possibilities" group, and any which do not meet the thickness test are discarded, as previously described. Inquiry is then made (diamond 3955) as to whether any "combined possibilities" groups remain on the list. If not, a "marker not found" indication is sent to the OSR knowledge base (block 3960). If there are remaining groups on the "combined possibilities" list, the average log responses are computed for these remaining possibilities, as described above (block 3970), and the one having the closest average log responses to the marker is selected as being the marker (block 3980). A "marker found" indication is then sent for storage in the appropriate Observation object in the OSR knowledge base 160, along with indication of which logs, if any, are out of bounds (block 3990).

We claim:

1. Apparatus for monitoring well logging information obtained from logging apparatus moveable in a borehole in earth formations, comprising:

observation means, responsive to the logging information, for establishing observers which determine the presence of specified characteristics of the logging information and generating, as the logging apparatus traverses the borehole, observation-representative signals in response thereto; and knowledge base means, containing a number of stored observations and stored situations which are linked by specified relationships, for responding to said observation-representative signals by computing and outputting, as the logging apparatus traverses the borehole, an inference of a stored situation which is inferred from a stored observation corresponding to said observation-representative signals.

2. Apparatus as defined by claim 1, wherein said knowledge base means is operative to output said inference in real time with respect to the logging information being monitored.

3. Apparatus as defined by claim 2, further comprising buffer memory means for storing the logging information to be monitored, and wherein said observation means is responsive to logging information stored in said buffer memory means.

4. Apparatus as defined by claim 3, wherein said knowledge base means includes means responsive to said observation-representative signals for establishing at least one confirming observer in said observation means, said confirming observer being operative to determine the presence of further specified characteristics of the logging information and generate confirming observation-representative signals in response thereto; and wherein said knowledge base means is also responsive to said confirming signals in computing said inference.

5. Apparatus as defined by claim 4, wherein said observation means and said knowledge base means are implemented by a computer system, and wherein the observers in said observation means and the stored observations and situations in the knowledge base means are in the form of objects of an object-oriented programming system, said objects being arranged in hierarchical classes and having slots which define their characteristics.

6. Apparatus as defined by claim 5, wherein said confirming observer can operate asynchronously with said first mentioned observers.

7. Apparatus as defined by claim 5, wherein said confirming observer is provided with depth or time boundaries that are dynamically adjusted in accordance with the depth locations associated with said observation-representative signals.

8. Apparatus as defined by claim 2, wherein said knowledge base means includes means responsive to said observation-representative signals for establishing at least one confirming observer in said observation means, said confirming observer being operative to determine the presence of further specified characteristics of the logging information and generate confirming observation-respresentative signals in response thereto; and wherein said knowledge base means is also responsive to said confirming signals in computing said inference.

9. Apparatus as defined by claim 2, wherein said observation means and said knowledge base means are implemented by a computer system, and wherein the observers in said observation means and the stored observations and situations in the knowledge base means are in the form of objects of an object-oriented programming system, said objects being arranged in hierarchical classes and having slots which define their characteristics.

10. Apparatus as defined by claim 1, further comprising buffer memory means for storing the logging information to be monitored, and wherein said observation means is responsive to logging information stored in said buffer memory means.

11. Apparatus as defined in claim 10, wherein said knowledge base means inlcudes means responsive to said observation-representative signals for establishing at least one confirming observer in said observation means, said confirming observer being operative to determine the presence of further specified characteristics of the logging information and generate confirming observation-representative signals in response thereto; and wherein said knowledge base means is also responsive to said confirming signals in computing said inference.

12. Apparatus as defined by claim 11, wherein said observation means is operative to establish observers which determine a characteristic of the logging information which persists over at least an operator-specified interval of depth levels.

13. Apparatus as defined by claim 12, wherein said observation means is operative to establish observers which permit gaps of operator-specified intervals of depth levels in determining the persistence of a characteristic.

14. Apparatus as defined by claim 11, wherein said observation means is operative to establish observers which determine a characteristic as being present over a processing window of depth levels, and wherein the presence of the characteristic is extended to account for the size of the processing window.

15. Apparatus as defined by claim 11, wherein said confirming observer can operate asynchronously with said first mentioned observers.

16. Apparatus as defined by claim 11, wherein said confirming observer is provided with depth or time boundaries that are dynamically adjusted in accordance with the depth locations associated with said observation-representative signals.

17. Apparatus as defined by claim 1, wherein said observation means and said knowledge base means are implemented by a computer system, and wherein the observers in said observation means and the stored observations and situations in the knowledge base means are in the form of objects of an object-oriented programming system, said objects being arranged in hierarchical classes and having slots which define their characteristics.

18. Apparatus as defined by claim 1, wherein said observation means is operative to establish observers which determined a characteristic of the logging information which persists over at least an operator-specified interval of depth levels.

19. Apparatus as defined by claim 18, wherein said observation means is operative to establish observers which permit gaps of operator-specified intervals of depth levels in determining the persistence of a characteristic.

20. Apparatus as defined by claim 1, wherein said observation means is operative to establish observers which determine a characteristic as being present over a processing window of depth levels, and wherein the presence of the characteristic is extended to account for the size of the processing window.

21. Apparatus for monitoring well logging information obtained from logging apparatus moveable in a borehole in earth formations, comprising:
    means for storing expected location range and expected loggign characteristics for at least one geological marker traversed by the borehole;
    means for establishing an observer which detects the presence of a specified characteristics of the logging information to identify the locations of candidate beds within the expected location range of the marker;
    means for establishing at least one further observer which detects the presence of at least one further specified characteristic of the logging information at the locations of the candidate beds;
    means for screening the candidate beds by testing said at least one further specified characteristic against said expected logging characteristics, and removing candidates which do not meet the test;
    means for combining any remaining candidates into groups;
    means for selecting the group, if any, which most closely resembles the marker by comparison of observed characteristics with expected characteristics; and
    means for generating output indications of the presence and location of the group which most closely resembles the marker.

22. Apparatus as defined by claim 21, wherein said output indications are generated in real time with respect to the logging information being monitored.

23. Apparatus as defined by claim 22, further comprising a buffer memory for storing the logging information to be monitored, and wherein said observer and said at least one further observer are responsive to logging information stored in said buffer memory.

24. Apparatus as defined by claim 23, wherein said storing means further stores an expected thickness range of said marker, and wherein said selecting means is operative to first eliminate any group having a thickness that is outside said expected thickness range.

25. Apparatus as defined by claimd 21, further comprising a buffer memoryu for storing the logging information to be monitored, and wherein said observer and said at least one further observer are responsive to logging information stored in said buffer memory.

26. Apparatus as defined by claim 25, wherein said means for establishing at least one further observer includes means for providing depth indications for said further observer which are dependent on the depths where said specified characteristic is found to be present, said provided depth indications being dynamically adjusted as a candidate bed grows in size.

27. Apparatus as defined by claim 21, wherein said storing means further stores an expected thickness range of said marker, and wherein said selecting means is operative to first eliminate any group having a thickness that is outside said expected thickness range.

28. Apparatus as defined by claim 27, wherein said storing means further stores a maximum streak thickness for the marker, and wherein said means for combining candidates into groups is operative to group candidates which are separated by less than the maximum streak thickness.

29. Apparatus as defined by claim 21, wherein said storing means further stores a maximum streak thickness for the marker, and wherein said means for combining candidates into groups is operative to group candidates which are separated by less than the maximum streak thickness.

30. Apparatus as defined by claim 29, wherein said logging apparatus includes a plurality of logging devices, and wherein said means for detecting the presence of a specified characteristic comprises means for determining if the log readings of one of said logging devices is within a particular range over a series of depth levels.

31. Apparatus as defined by claim 30, wherein said means for detecting the presence of at least one further specified characteristic comprises determining log readings of other logging devices of said logging apparatus.

32. Apparatus as defined by claim 21, wherein said logging apparatus includes a plurality of logging devices, and wherien said means for detecting the presence of a specified characteristic comprises means for determining if the log readings of one of said logging devices is within a particular range over a series of depth levels.

33. Apparatus as defined by claim 32, wherein said means for detecting the presence of at least one further specified characteristic comprises determining log readings of other logging devices of said logging apparatus.

34. Apparatus as defined by claim 32, wherein said means for screening the candidate beds is operative to test said log readings of said other logging devices against said expected logging characteristics.

35. Apparatus as defined by claim 34, wherein said means for screening the candidate beds is operative to test said log readings in two stages, the first stage requiring a relatively less stringent comparison criterion to be met by all of said log readings against the expected logging characteristics, and the second stage requiring a relatively more stringent comparison criterion to be met by only at least some of said log readings against the expected logging characteristics.

36. Apparatus as defined by claim 32, wherein said means for generating output indications includes means for generating output indications of the status of the log readings of said other logging devices in the region of the group which most closely resembles the marker.

37. Apparatus as defoined by claim 21, wherein said means for establishing at least one further observer includes means for providing depth indications for said further observer which are dependent on the depths where said specified characteristic is found to be present, said provided depth indications being dynamically adjusted as a candidate bed grows in size.

38. A method for monitoring well logging information obtained from logging apparatus moveable in a borehole in earth formations, comprising the steps of:
    establishing observers which determine the presence of specified characteristics of the logging information and generating observation-representative signals in response thereto as the logging apparatus traverses the borehole;

providing a knowledge base which contains a number of stored observations and stored situations which are linked by specified relationships; and responding to said observation-representative signals by computing and outputting, as the logging apparatus traverses the borehole, an inference of a stored situation which is inferred from a stored observation corresponding to said observation-representative signals.

39. The method as defined by claim 38, wherein said knowledge base is operative to output said inference in real time with respect to the logging information being monitored.

40. The method as defined by claim 38, further comprising storing the logging information to be monitored in a buffer, and wherein said observers are responsive to logging information stored in the buffer.

41. The method as defined by claim 38, wherein said observers are operative to determine a characteristic of the logging information which persists over at least an operator-specified interval of depth levels.

42. The method as defined by claim 41, wherein said observers are operative to permit gaps of operator-specified intervals of depth levels in determining the persistence of a characteristic.

43. The method as defined by claim 38, wherein said observers are operative to determine a characteristic as being present over a processing window of depth levels, and wherein the presence of the characteristic is extended to account for the size of the processing window.

44. A method for monitoring well logging information obtained from logging apparatus moveable in a borehole in earth formations, comprising the steps of:

storing expected location range and expected logging characteristics for at least one geological marker traversed by the borehole;

extablishing an observer which detects the presence of a specified characteristic of the logging information to identify the locations of candidate beds within the expected location range of the marker;

establishing at least one further observer which detects the presence of at least one further specified characteristic of the logging information at the locations of the candidate beds;

screening the candidate beds by testing said at least one further specified characteristic against said expected logging characteristics, and removing candidates which do not meet the test;

combining any remaining candidates into groups;

selecting the group, if any, which most closely resembles the marker by comparison of observed characteristics with expected characteristics; and generatign output indications of the presence and location of the group which most closely resembles the marker.

45. The method as defined by claim 44, wherein said output indications are generated in real time with respect to the logging information being monitored.

46. The method as defined by claim 44, further comprising the step of storing the logging information to be monitored in a buffer memory, and wherein said observer and said at least one further observer are responsive to logging information stored in said buffer memory.

47. The method as defined by claim 44, wherein said storing step includes storing an expected thickness range of said marker, and wherein said selecting step is operative to first eliminate any group having a thickness that is outside said expected thickness range.

48. The method as defined by claim 44, wherein said storing step includes storing a maximum streak thickness for the marker, and wherein said step of combining candidates into groups is operative to group condidates which are separated by less than the maximum streak thickness.

49. The method as defined by claim 44, wherein said step of establishing at least one further observer includes providing depth indications for said further observer which are dependent on the depths where said specified characteristic is found to be present, said provided depth indications being dynamically adjusted as a candidate bed grows in size.

50. Apparatus for monitoring well logging information obtained from logging apparatus moveable in a borehole in earth formations, comprising:

observation means, responsive to the logging information, for establishing observers which determine the presence of specified characteristics of the logging information and generating observation-representative signals in response thereto, said observation means being operative to establish at least some observers which permit gaps of opertor-specified intervals of depth levels in determining the persistence of a characteristic; and knowledge base means, containing a number of stored observations and stored situations which are linked by specified relatinoships, for responding to said observation-representative signals by computing and outputting an inference of a stored situation which is inferred from a stored observation corresponding to said observation-representative signals.

51. Apparatus as defined by claim 50, wherein said knowledge base means includes means responsive to said observation-representative signals for establishing at least one confirming observer in said observation means, said confirming observer being operative to determine the presence of further specified characteristics of the logging information and generate confirming observation-representative signals in response thereto; and wherein said knowledge base means is also responsive to said confirming signals in computing said inference.

52. Apparatus for monitoring well logging information obtained from logging apparatus moveable in a borehole in earth formations, comprising:

observation means, responsive to the logging information, for establishing observers which determined the presence of speicifed characteristics of the logging information and generating observation-representative signals in response thereto, said observation means being operative to establish observers which determine a characteristic as being present over a processing window of depth levels, the presence of the characteristic being extended to account for the size of the processing window; and knowledge base means, containing a number of stored observations and stored situations which are linked by specified relationships, for responding to said observation-representative signals by computing and outputting an inference of a stored situation which is inferred from a stored observation corresponding to said observation-representative signals.

53. Apparatus as defined by claim 52, wherein said knowledge base mans includes means responsive to said observation-representative signals for establishing at least one confirming observer in said observation means, said confirming observer being operative to determine the presence of further specified characteristics of the logging information and generate confirming observation-representative signals in response thereto; and wherein said knowledge base means is also responsive to said confirming signals in computing said inference.

54. Apparatus for monitoring well logging information obtained from logging apparatus moveable in a borehole in earth formations, comprising:
    buffer memory means for storing logging information to be monitored;
    observation means, responsive to the logging information in said buffer memory means, for establishing observers which determine the presence of specified characteristics of the logging information and generating obsrevation-representative signals in response thereto; and
    knowledge base means, containing a number of stored observations and stored situations which are linked by specified relationships, for responding to said observation-representative signals by computing and outputting an inference of a stored situation which is inferred from a stored observation corresponding to said observation-representative signals, said knowledge base means including means responsive to said observation-representative signals for establishing at least one confirming observer in said observation means, said confirming observer being operative to determine the presence of further specified characteristics of the logging information and generate confirming observation-representative signals in response therto; said confirming observer being provided with detpth or time boundaries that are dynamically adjusted in accordance with the depth locations associated with said observation-representaitve signals; said knowledge base means being also responsive to said confirming signals in computing said inference.

55. Apparatus as defined by claim 54, wherein said observation means and sadi knowledge base means are implemented by a computer system, and wherein the observers in said observation means and the stored observations and situations in the knowledge base means are in the form of objects of an object-oriented programming system, said objects being arranged in hierarchical classes and having slots which define their characteristics.

56. A method for monitoring well logging information obtained from logging apparatus moveable in a borehole in earth formations, comprising the steps of:
    establishing observers which determine the presence of specified characteristics of the logging information and generating observation-representative signals in response thereto, at least some of said observers being operative to permit gaps of operator-specified intervals of depth levels in determining the persistence of a characteristic;
    providing a knowledge base which contains a number of stored observations and stored situations which are linked by specified relationships; and
    responding to said observation-representative signals by computing and outputting an inference of a stored situation which is inferred from a stored observation corresponding to said observation-representative signals.

57. A method for monitoring well logging information obtained from logging apparatus moveable in a borehole in earth formations, comprising the steps of:
    establishing observers which determine the presence of specified characteristics of the logging information and generating observation-representative signals in response thereto, at least some of said observers being operative to determine a characteristic as being present over a processing window of depth levels, the presence of said characteristic being extended to account for the size of the processing window;
    providing a knowledge base which contains a number of stored observations and stored situations which are linked by specified relationships; and
    responding to said observation-representative signals by computing and outputting an inference of a stored situation which is inferred from a stored observation corresponding to said observation-representative signals.

* * * * *